United States Patent
Park

(10) Patent No.: US 11,592,970 B2
(45) Date of Patent: Feb. 28, 2023

(54) MOBILE TERMINAL FOR DISPLAYING NOTIFICATION USER INTERFACE (UI) AND CONTROL METHOD THEREOF

(71) Applicant: LG ELECTRONICS INC., Seoul (KR)

(72) Inventor: Shin Hyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 17/166,987

(22) Filed: Feb. 3, 2021

(65) Prior Publication Data

US 2022/0066602 A1 Mar. 3, 2022

(30) Foreign Application Priority Data

Aug. 28, 2020 (WO) ................ PCT/KR2020/011568

(51) Int. Cl.
G06F 9/54 (2006.01)
G06F 3/0484 (2022.01)
H04L 67/55 (2022.01)
G06F 3/04817 (2022.01)

(52) U.S. Cl.
CPC ........ *G06F 3/0484* (2013.01); *G06F 3/04817* (2013.01); *G06F 9/542* (2013.01); *H04L 67/26* (2013.01); *G06F 2203/04803* (2013.01)

(58) Field of Classification Search
None
See application file for complete search history.

(56) References Cited

U.S. PATENT DOCUMENTS

| 9,152,479 | B2 | 10/2015 | Yang |
| 2014/0181843 | A1* | 6/2014 | Yang ................ H04M 1/724 719/318 |
| 2016/0342327 | A1 | 11/2016 | Chi et al. |
| 2017/0083226 | A1* | 3/2017 | Cho .................... G06F 3/04842 |
| 2017/0168628 | A1 | 6/2017 | Yin |
| 2018/0337968 | A1* | 11/2018 | Faulkner ............. H04L 12/1813 |
| 2018/0364648 | A1* | 12/2018 | Chi .................... G06F 3/147 |
| 2020/0233539 | A1* | 7/2020 | Liu .................. H04M 1/72472 |
| 2021/0034223 | A1 | 2/2021 | Sun |
| 2021/0181853 | A1* | 6/2021 | Hassan ............. G06F 3/04817 |

FOREIGN PATENT DOCUMENTS

| CN | 108255378 | 7/2018 |
| KR | 20140081944 | 7/2014 |
| KR | 20150027613 | 3/2015 |
| KR | 10-2016-0137293 | 11/2016 |

OTHER PUBLICATIONS

PCT International Application No. PCT/KR2020/011568, International Search Report dated May 26, 2021, 4 pages.

* cited by examiner

*Primary Examiner* — Rinna Yi
(74) *Attorney, Agent, or Firm* — Lee Hong Degerman Kang & Waimey

(57) ABSTRACT

Disclosed is a mobile terminal including a display and a processor, wherein the processor receives a first input related to displaying a notification user interface (UI) on a first area of the display in which first content is displayed and displays a notification UI in a second area of the display distinguished from the first area in response to the first input when a setting related to displaying the notification UI of the first content corresponds to a first setting.

18 Claims, 18 Drawing Sheets

MOBILE TERMINAL FOR DISPLAYING NOTIFICATION USER INTERFACE (UI) AND CONTROL METHOD THEREOF

CROSS-REFERENCE TO RELATED APPLICATION

Pursuant to 35 U.S.C. § 119 (a), this application claims the benefit of an earlier filing date and right of priority to International Application No. PCT/KR2020/011568 filed on Aug. 28, 2020, the contents of which are hereby incorporated by reference herein in its entirety.

BACKGROUND

1. Field

This disclosure relates to a mobile terminal for displaying a notification user interface (UI) based on a setting related to a notification UI display and a control method thereof. One particular implementation relates to a mobile terminal for displaying a notification UI in at least a portion of a first area and a second area of a display based on a setting related to a notification UI display and a control method thereof.

2. Description of the Related Art

A mobile terminal provides information to be notified to a user about a state of the mobile terminal through a notification user interface (UI). The notification UI may be referred to as terms such as a notification bar, a notification window, or notification content depending on a case. In general, the notification UI may be displayed on a top of the mobile terminal in response to a user's input and include information to be notified to the user such as various notifications and states of the mobile terminal.

More specifically, the information to be notified to the user may include, for example, information indicating that a specific application is being executed, information indicating that a text message is received, and a push message received from a specific application. Accordingly, through the notification UI, the user may check a message received in real time or easily check various information associated with applications.

The notification UI may be displayed in one area of a display of the mobile terminal in response to an input of a user requesting the notification UI to be displayed. In this instance, a function of an application currently executed may be suspended in response to the notification UI being displayed. In some cases, the mobile terminal may support a multitasking function for executing a plurality of applications. In such cases, all functions of the plurality of applications currently executed may be suspended in response to the notification UI being displayed. That is, when the notification UI is displayed, provision of content displayed on the display of the mobile terminal may be temporarily suspended. Due to this, even though the user wants to continually use an application irrespective of the displaying of the notification UI, once the notification UI is displayed, it is not possible to continually use the application, which may cause inconvenience.

Accordingly, there is a desire for a method of appropriately controlling displaying a notification UI based on a situation related to a mobile terminal.

SUMMARY

An aspect provides a mobile terminal that displays a notification user interface (UI) in at least a portion of a first area and a second area of a display based on a setting related to notification UI displaying to provide the notification UI in a more suitable form in consideration of use of an application currently executed, and a control method of the mobile terminal.

Technical goals of the present disclosure are not limited as mentioned above and, although not mentioned, may include goals that can be clearly understood by those skilled in the art to which the present disclosure pertains, from the following description.

According to an aspect, there is provided a mobile terminal including a display and a processor, wherein the processor is configured to receive a first input related to a notification user interface (UI) display on a first area of the display in which first content is displayed and display a notification UI in a second area of the display distinguished from the first area in response to the first input when a setting related to the notification UI display of the first content corresponds to a first setting.

According to another aspect, there is also provided a control method of a mobile terminal, the method including receiving a first input related to a notification UI display on a first area in which first content is displayed, and displaying a notification UI in a second area of a display distinguished from the first area in response to the first input when a setting related to the notification UI display of the first content corresponds to a first setting.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1A:
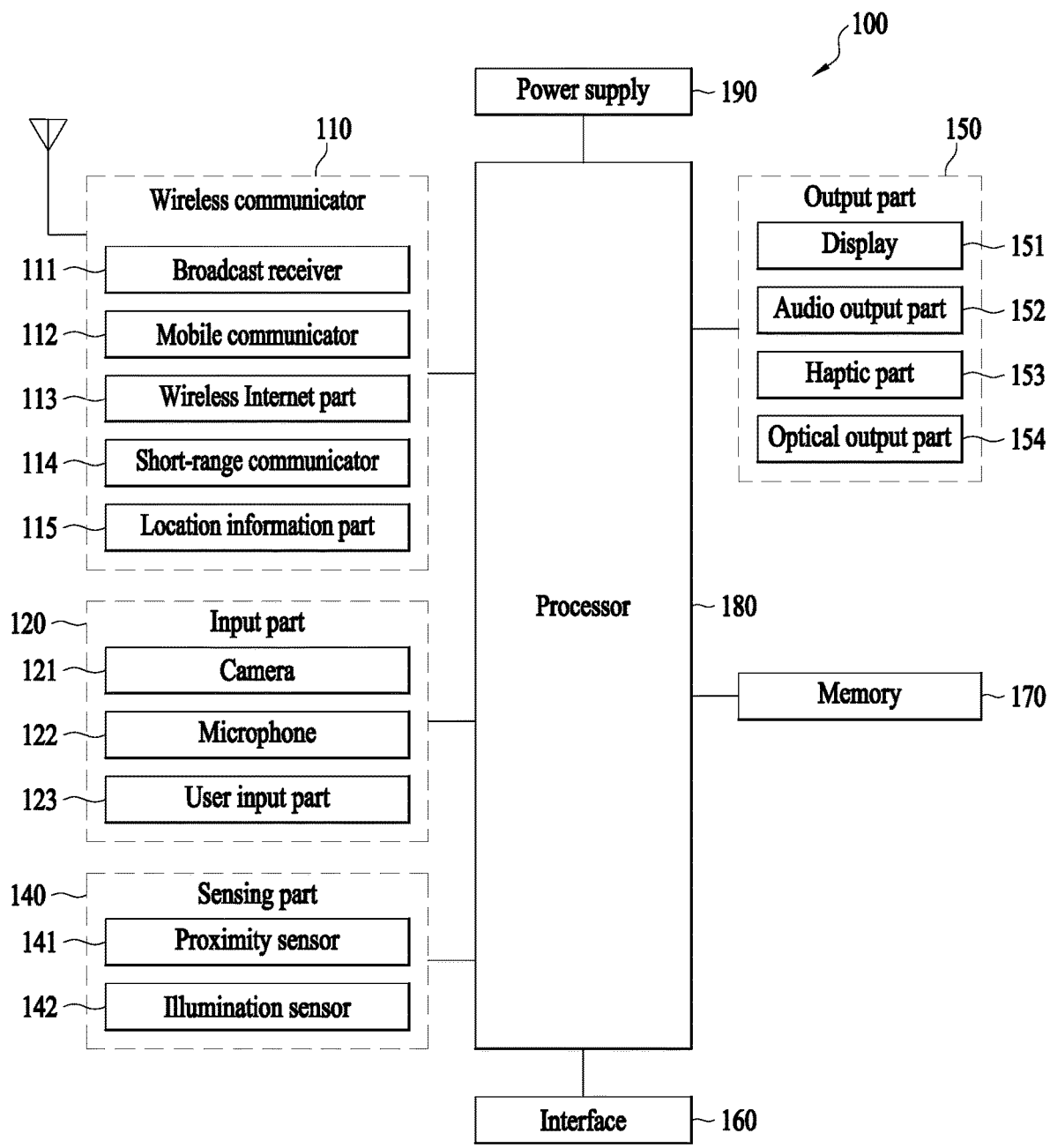
FIG. 1A is a block diagram illustrating a mobile terminal according to the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. It should be understood, however, that there is no intent to limit this disclosure to the particular example embodiments disclosed. Further, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Mobile terminals presented herein may be implemented using a variety of different types of terminals. Examples of such terminals include mobile phones, smartphones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, as would be apparent to those skilled in the art, the configuration according to the embodiment described in the present specification may be applied to a stationary terminal such as a digital TV, a desktop computer, and a digital signage, except when applicable only to a mobile terminal.

Figure 1B:
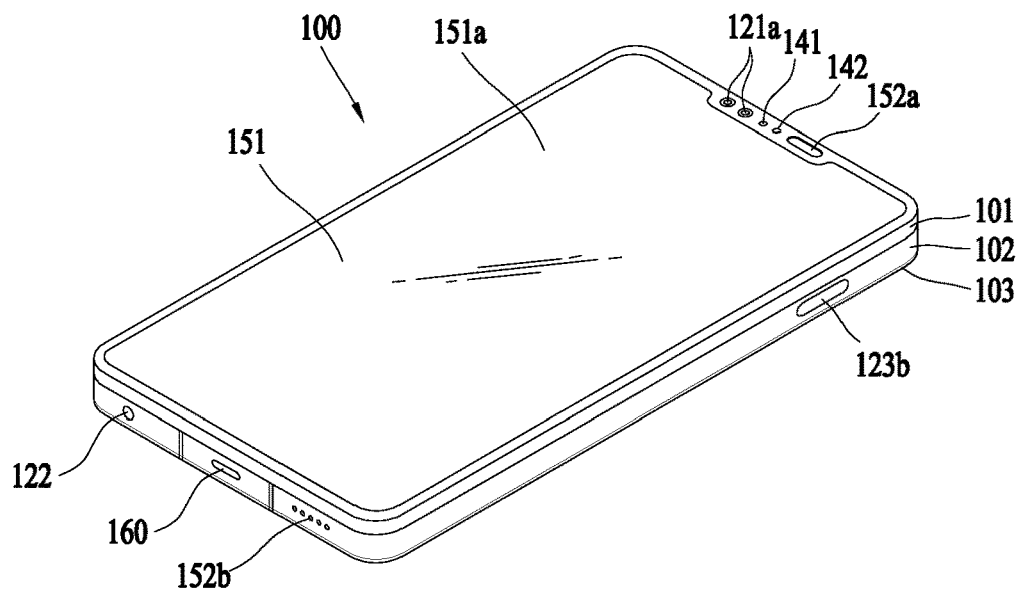
FIGS. 1B and 1C are conceptual diagrams illustrating an example of a mobile terminal viewed from different directions according to the present disclosure.
Figure 1C:
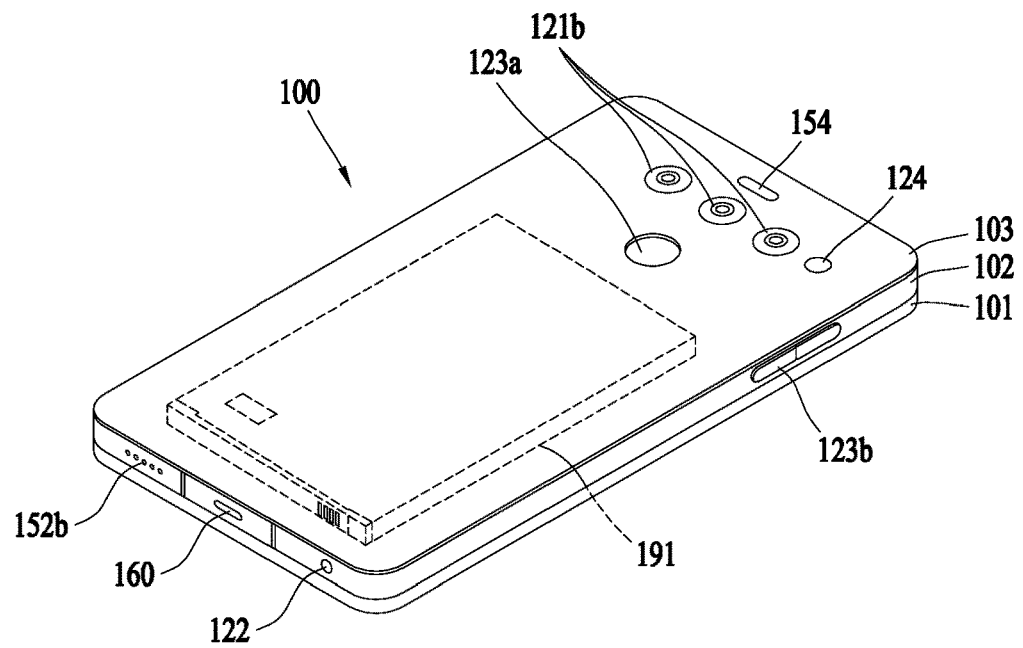

Referring to FIGS. 1A through 1C, FIG. 1A is a block diagram illustrating a mobile terminal 100 according to the present disclosure, and FIGS. 1B and 1C are conceptual diagrams illustrating an example of the mobile terminal 100 viewed from different directions according to the present disclosure.

Figure 3:
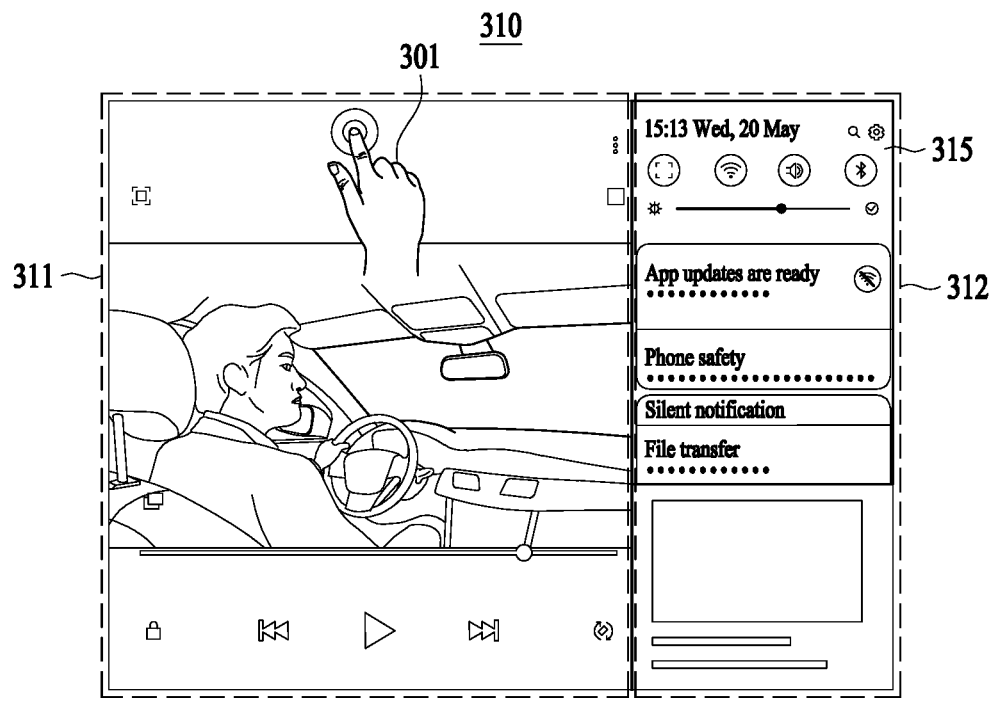
FIG. 3 is a conceptual diagram illustrating a mobile terminal according to an example embodiment of the present disclosure.
Figure 3:
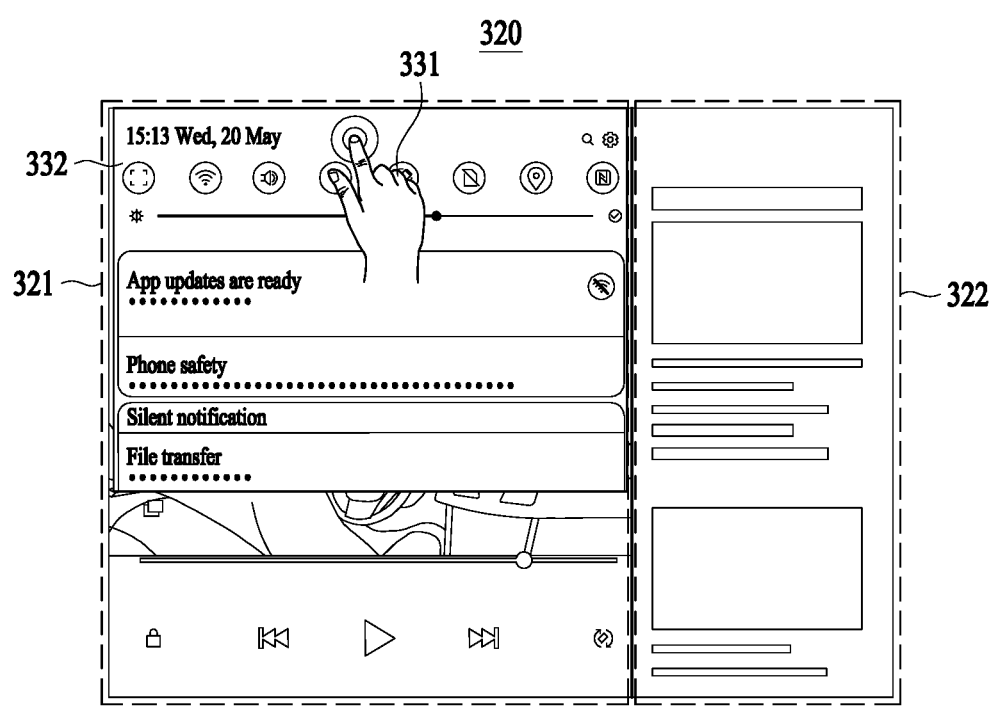

The mobile terminal 100 may include a wireless communicator 110, an input part 120, a sensing part 140, an output part 150, an interface 160, a memory 170, a controller 180, and a power supply 190. It is understood that implementing all of the components illustrated in FIG. 3 is not a requirement, and that greater or fewer components may alternatively be implemented.

More specifically, the wireless communicator 110 may include one or more modules which enable communications such as wireless communications between the mobile terminal 100 and a wireless communication system, communications between the mobile terminal 100 and another mobile terminal 100, communications between the mobile terminal 100 and an external server. Further, the wireless communicator 110 typically includes one or more modules which connect the mobile terminal 100 to one or more networks.

The wireless communicator 110 may include one or more of a broadcast receiver 111, a mobile communicator 112, a wireless Internet part 113, a short-range communicator 114, and a location information part 115.

The input part 120 may include a camera 121 for obtaining images or video or an image input part, a microphone 122 for inputting an audio signal or an audio input part, a user input part 123 (for example, a touch key, a push key, and the like) for allowing a user to input information, and the like. Voice data or image data collected by the input part 120 may be analyzed and processed into a user's control command.

The sensing part 140 may include one or more sensors configured to sense at least one of internal information of the mobile terminal 100, the surrounding environment of the mobile terminal 100, or user information. For example, the sensing part 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 121), a microphone (for example, the microphone 122), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from two or more sensors of the aforementioned sensors, and combinations thereof.

The output part 150 is configured to generate various types of output, such as audio, video, tactile output, and the like. The display 151 may be inter-layered with or integrally formed with a touch sensor to facilitate a touch screen. Such a touch screen may provide an output interface between the mobile terminal 100 and a user, as well as function as the user input part 123 which provides an input interface between the mobile terminal 100 and the user.

The interface 160 serves as an interface with various types of external devices that can be coupled to the mobile terminal 100. The interface 160 may include, for example, at least one of a wired or wireless port, an external power supply port, a wired or wireless data port, a memory card port, a port for connecting a device having an identification module, an audio input/output (I/O) port, a video I/O port, or an earphone port. In some cases, the mobile terminal 100 may perform assorted control functions associated with a connected external device, in response to the external device being connected to the interface 160.

The memory 170 stores data to support various functions or features of the mobile terminal 100. For instance, the memory 170 may be configured to store application programs executed in the mobile terminal 100, data or instructions for operations of the mobile terminal 100, and the like. At least some of the application programs may be downloaded from an external server via wireless communication. At least some of the application programs may be installed within the mobile terminal 100 at time of manufacturing or shipping, which is typically the case for basic functions of the mobile terminal 100 (for example, receiving a call, placing a call, receiving a message, sending a message, and the like). Meanwhile, application programs may be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs stored in the memory 170, thereby processing or providing appropriate information and/or functions to a user.

In order to execute application programs stored in the memory 170, the controller 180 may control at least some of the above-described components described with reference to FIG. 1A. Further, in order to execute application programs stored in the memory 170, the controller 180 may control at least two or more of the components included in the mobile terminal 100 in combination.

Under the control of the controller 180, the power supply 190 receives external power or internal power or provide power to each component included in the mobile terminal 100. The power supply 190 may include a battery, and the battery may be an embedded battery or a replaceable battery.

The power supply 190 may be connected with a power supply port, the power supply port may be configured as an example of the interface 160 to which an external charger for supplying power is electrically connected to charge a battery.

At least one portion of the respective components mentioned in the foregoing description can cooperatively operate to implement operations, controls or controlling methods of the mobile terminal 100 according to various embodiments of the present disclosure mentioned in the following description. Moreover, the operations, controls or controlling methods of the mobile terminal 100 can be implemented in the mobile terminal upon execution of at least one or more application programs stored in the memory 170.

Prior to explaining various embodiments of the mobile terminal 100, the aforementioned components are described in greater detail with reference to FIG. 1A.

Regarding the wireless communicator 110, the broadcast receiver 111 of the wireless communicator 110 is typically configured to receive a broadcast signal and/or broadcast associated information from an external broadcast managing entity via a broadcast channel. The broadcast channel may include a satellite channel, a terrestrial channel, or both. Two or more broadcast receiving modules may be provided in the mobile terminal 100 for simultaneous broadcast reception or broadcast channel switching of at least two broadcast channels.

The broadcast management server may refer to a server that generates and transmits a broadcast signal and/or broadcast-related information or a server that receives and transmits a previously generated broadcast signal and/or broadcast-related information to a terminal. The broadcast signal may include not only a TV broadcast signal, a radio broadcast signal, and a data broadcast signal, but also a broadcast signal in a form in which a data broadcast signal is combined with a TV broadcast signal or a radio broadcast signal.

The broadcast signal may be encoded according to at least one of technical standards (or broadcast methods, for example, ISO, IEC, DVB, ATSC, etc.) for transmission and reception of a digital broadcast signal, and the broadcast receiver 111 may receive the digital broadcast signal using a method suitable for technical specifications determined by the technical standards.

The broadcast-related information may refer to information related to a broadcast channel, a broadcast program, or a broadcast service provider. The broadcast-related information may also be provided through a mobile communication network. In this case, the broadcast-related information may be received by the mobile communicator 112.

The broadcast-related information may exist in various forms such as an electronic program guide (EPG) of digital multimedia broadcasting (DMB) or an electronic service guide (ESG) of digital video broadcast-handheld (DVB-H), for example. The broadcast signal and/or broadcast-related information received through the broadcast receiver 111 may be stored in the memory 170.

The mobile communicator 112 may transmit and receive a wireless signal to and from at least one of a base station, an external terminal, and a server on a mobile communication network constructed based on technical standards for mobile communication or communication schemes such as global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like, for example.

The wireless signal may include a voice call signal, a video call signal, or various types of data according to transmission and reception of text/multimedia messages.

The wireless Internet part 113 may refer to a module for wireless Internet access, and may be embedded or disposed external to the mobile terminal 100. The wireless Internet part 113 may be adapted to transmit or receive the wireless signal in the communication network based on wireless Internet technologies.

The wireless Internet technologies may be, for example, wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), and long term evolution-advanced (LTE-A). The wireless Internet part 113 may transmit and receive data based on at least one wireless Internet technology in a range including Internet technologies not listed above.

In view of that the wireless Internet access made by WiBro, HSDPA, HSUPA, GSM, CDMA, WCDMA, LTE, and LTE-A is based on a mobile communication network, the wireless Internet part 113 that performs the wireless Internet access through the mobile communication network may be understood as a kind of the mobile communicator 112.

The short-range communicator 114 may be for short-range communication, and may support the short-range communication using at least one of Bluetooth™, radio frequency identification (RFID), infrared data association (IrDA), ultra wideband (UWB), ZigBee, near field communication (NFC), Wi-Fi, Wi-Fi Direct, and wireless universal serial bus (USB) technology. The short-range communicator 114 may use wireless area networks to support wireless communication between the mobile terminal 100 and a wireless communication system, wireless communication between the mobile terminal 100 and another mobile terminal 100, or wireless communication between the mobile terminal 100 and a network in which another mobile terminal (100 or external server). The wireless range networks may be wireless personal area networks.

Here, another mobile terminal may be a wearable device, for example, a smart watch, a smart glass or an HMD, which is able to exchange or (interwork) data with the mobile terminal 100. The short-range communicator 114 may sense or recognize a wearable device capable of communicating with the mobile terminal 100 in a vicinity of the mobile terminal 100. In addition, when the sensed wearable device is a device which is authenticated to communicate with the mobile terminal 100, at least a portion of data processed in the mobile terminal 100 may be transmitted to the wearable device via the short-range communicator 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information part 115 may be a module that acquires a position (or current position) of a mobile terminal. A representative example of the location information part 115 may be a global positioning system (GPS) mobile or a Wi-Fi module. The mobile terminal may use the GPS module to acquire a position of the mobile terminal using signals transmitted from a GPS satellite. The mobile terminal may use the Wi-Fi module to acquire a position of the mobile terminal based on information on a wireless access point (AP) that transmits or receives a wireless signal to or from the Wi-Fi module. As necessary, the location information part 115 may perform a certain function of other modules of the wireless communicator 110 to acquire data on the position of the mobile terminal, additionally or in substitution. The location information part 115 may be a module used to acquire a position (or current position) of the mobile terminal and is not limited as a module that directly calculates or acquires a position of the mobile terminal.

Subsequently, the input part 120 is configured to input image information (or signal), audio information (or signal), data, or information input from a user. To input the image information, the mobile terminal 100 may include a single camera 121 or a plurality of cameras 121. The camera 121 may process an image frame such as a stationary image or a moving image acquired by an image sensor in a video call mode or a capturing mode. The processed image frame may be displayed on the display 151 or stored in the memory 170. Meanwhile, the plurality of cameras 121 may be arranged in a matrix structure. Through the cameras 121 arranged in the matrix structure, a plurality of pieces of image information having various angles and focal points may be input to the mobile terminal 100. Also, the plurality of cameras 121 may be arranged in a stereo structure to acquire left and right images for implementing a stereo image.

The microphone 122 may process an external acoustic signal into electrical voice data. The processed voice data may be variously used based on a function performed (or an application program executed) in the mobile terminal 100. In the microphone 122, various noise removal algorithms may be implemented to remove noise generated in a process of receiving external acoustic signals.

The user input part 123 may be to receive information from a user. When the information is input through the user input part 123, the processor 180 may control an operation of the mobile terminal 100 based on the input information. The user input part 123 may include a mechanical input means (or a mechanical key, for example, a button a dome switch, a jog wheel, and a jog switch on a front, rear, or side surface of the mobile terminal 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in any combination of, for example, graphics, texts, icons, and videos.

The sensing part 140 may sense at least one of information in the mobile terminal 100, surrounding environment information of the mobile terminal 100, and user information and generate a sensing signal corresponding thereto. The controller 180 may control an operation or driving of the mobile terminal 100 based on such sensing signal, or perform data processing, functions, or operations related to application programs installed in the mobile terminal 100. Representative sensors of various sensors to be included in the sensing part 140 will be described in detail.

The proximity sensor 141 may refer to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141 may include, for example, any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (or touch sensor) may also be classified as a proximity sensor.

The term "proximity touch" will often be referred to herein to denote the scenario in which an object is positioned to be proximate to the touch screen without contacting the touch screen. The term "contact touch" will often be referred to herein to denote the scenario in which an object actually makes physical contact with the touch screen. For the position corresponding to the proximity touch of the object relative to the touch screen, such position will correspond to a position where the object is perpendicular to the touch screen. The proximity sensor 141 may sense proximity touch, and proximity touch patterns (for example, distance, direction, speed, time, position, moving status, and the like). Meanwhile, the controller 180 may process data (or information) corresponding to proximity touches and proximity touch patterns sensed by the proximity sensor 141, and output visual information corresponding to the processed data on the touch screen. In addition, the controller 180 may control the mobile terminal 100 to execute different operations or process different data according to whether a touch to the same point on the touch screen is either a proximity touch or a contact touch.

The touch sensor may sense a touch (or touch input) applied to the touch screen (or the display 151) based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like. Here, the touch object is an object that applies a touch to the touch sensor and may be, for example, a finger, a touch pen, a stylus pen, or a pointer.

As such, when there is a touch input to the touch sensor, the corresponding signal(s) may be transmitted to a touch controller. The touch controller may process the signal(s) and then transmit corresponding data to the controller 180. Through this, the controller 180 may acknowledge which area of the display 151 has been touched. Here, the touch controller may be a separate component from the controller 180 or may be the controller 180 itself.

Meanwhile, the controller 180 may perform different controls or the same control based on a type of the touch object that touches the touch screen (or a touch key provided in addition to the touch screen). Whether to perform different controls or the same control based on the type of the touch object may be determined in accordance with a current operation state of the mobile terminal 100 or an application program being executed.

The touch sensor and the proximity sensor described above may be implemented individually, or in combination, to sense various types of touches. Such touches may include a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize position information relating to a touch object using ultrasonic waves. The controller 180 may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. More specifically, the position of the wave generation source may be calculated using the time difference from the time that the ultrasonic wave reaches the sensor based on the light as a reference signal.

As a component of the input part 120, the camera 121 may include at least one a camera sensor (CCD, CMOS, etc.), a photo sensor (or image sensors), and a laser sensor.

The camera 121 and the laser sensor may be implemented in combination to detect a touch of a physical object with respect to a 3D stereoscopic image. The photo sensor may be laminated on a display element. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. That is, the photo sensor may calculate the coordinates of the physical object according to variation of light to thus obtain position information of the physical object.

The display 151 may display or output information processed in the mobile terminal 100. For example, the display 151 may display execution screen information of an application program executing at the mobile terminal 100 or user interface (UI) and graphic user interface (GUI) information in response to the execution screen information.

In addition, the display 151 may be implemented as a stereoscopic display unit for displaying stereoscopic images.

The stereoscopic display unit may employ a 3D display scheme such as a stereoscopic scheme (glass scheme), an auto-stereoscopic scheme (glassless scheme), a projection scheme (holographic scheme), or the like.

An acoustic output part 152 may output audio data stored in the memory 170 or received from the wireless communicator 110 in, for example, a call signal reception, a call mode or a recording mode, a voice recognition mode, and a broadcast reception mode. The acoustic output part 152 may output an acoustic signal related to a function (for example, a call signal reception sound and a message reception sound) performed in the mobile terminal 100. For example, the acoustic output part 152 may include at least one of a receiver, a speaker, or a buzzer.

A haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the processor 180. For example, the haptic part 153 may output a combination of different vibrations or output different vibrations in sequence.

Besides vibration, the haptic part 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic part 153 may also be implemented to allow the user to feel a tactile effect through a muscle sensation such as the user's fingers or arm, as well as transferring the tactile effect through direct contact. Two or more haptic parts 153 may be provided according to the particular configuration of the mobile terminal 100.

An optical output part 154 may output a signal to announce an event occurrence using light of a light source of the mobile terminal 100. An event occurring in the mobile terminal 100 may be, for example, message reception, a call signal reception, missed call, alarm, schedule notification, e-mail reception, and application-based information reception.

A signal output by the optical output part 154 may be implemented in such a manner that the mobile terminal emits monochromatic light or light with a plurality of colors. The signal output may be terminated as the mobile terminal senses that a user has checked the generated event, for example.

The interface 160 may function as a passage to various types of external devices connected to the mobile terminal 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the mobile terminal 100 may perform an appropriate control associated with the connected external device.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device can be connected with the terminal 100 via the interface 160.

When the mobile terminal 100 is connected with an external cradle, the interface 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal 100 is properly mounted on the cradle.

The memory 170 may store programs to support operations of the controller 180 and store input/output data (for example, phonebook, messages, still images, videos, etc.). The memory 170 may store data related to various patterns of vibrations and sound which are output in response to touch inputs on the touch screen.

The memory 170 may include one or more types of storage mediums including a flash memory, a hard disk, a solid state disk, a silicon disk, a multimedia card micro type, a card-type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The mobile terminal 100 may also be operated in relation to a web storage that performs the storage function of the memory 170 over a network, such as the Internet.

Meanwhile, as described above, the controller 180 may typically control overall operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control any one or any combination of those components in order to implement, in the mobile terminal 100, various example embodiments disclosed herein.

The power supply 190 receives external power or internal power under the control of the controller 180 and supply power required for operating respective elements and components included in the mobile terminal 100. The power supply 190 may include a battery. The battery may be an embedded rechargeable battery and may be detachably coupled to the terminal body for charging.

The power supply 190 may be connected with a power supply port, the power supply port may be configured as an example of the interface 160 to which an external charger for supplying power is electrically connected to charge a battery.

As another example, the power supply 190 may be configured to wirelessly charge the battery without use of the connection port. In this example, the power supply 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the mobile terminal 100 may have a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined to be movable relative to each other, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood as a concept referring to the mobile terminal 100 as at least one aggregate.

The mobile terminal 100 includes a case (for example, a frame, a housing, a cover, and the like) forming the appearance of the mobile terminal. As illustrated, the mobile terminal 100 may include a front case 101 and a rear case 102. Various electronic components are arranged in an inner space formed by coupling of the front case 101 and the rear case 102. At least one middle case may be additionally arranged between the front case 101 and the rear case 102.

The display 151 may be located on the front side of the mobile terminal body to output information. As illustrated, a window 151a of the display 151 may be mounted to the front case 101 to form the front surface of the mobile terminal body together with the front case 101.

In some cases, electronic components may also be mounted to the rear case 102. Examples of such electronic components include a detachable battery, an identification module, a memory card, and the like. In this case, a rear cover 102 may be detachably coupled to the rear case 102 to cover the electronic components mounted to the rear case. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. Meanwhile, the rear cover 103 may include an opening for externally exposing a camera 121b, an optical output part 154, a flash 124, a first manipulating part 123a, and the like.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases form an inner space for accommodating various electronic components, the mobile terminal 100 may be configured such that one case forms the inner space. In this example, a mobile terminal 100 having a uni-body is formed in such a manner that synthetic resin or metal extends from a side surface to a rear surface.

Meanwhile, the mobile terminal 100 may include a waterproof part (not shown) for preventing introduction of water into the mobile terminal body. For example, the waterproof part may include a waterproof member which is located between the window 151a and the front case 101, between the front case 101 and the rear case 102, or between the rear case 102 and the rear cover 103, to hermetically seal an inner space when those cases are coupled.

The mobile terminal 100 may be provided with the display 151, a first acoustic output part 152a, a second acoustic output part 152b, the proximity sensor 141, the illumination sensor 142, the optical output part 154, the first camera 121a, the second camera 121b, the first manipulating part 123a, a second manipulating part 123b, the microphone 122, the interface 160, and the like.

In the following, it is described by taking an example, as shown in FIGS. 1B and 1C, that the display 151, the first acoustic output part 152a, the proximity sensor 141, the illumination sensor 142, and the first camera 121a are arranged at the front side of the mobile terminal body, that the second manipulating part 123b, the second acoustic output part 152b, the microphone 122, and the interface 160 are arranged on a side surface of the mobile terminal body, and that the optical output part 154, the first manipulating part 123a, the second camera 121b, and the flash 124 are arranged at a rear side of the mobile terminal body.

However, these components are not limited to the above-described arrangement. Such components may be excluded or replaced or arranged on a different surface, when necessary. For example, the first manipulating part 123a may not be provided at the rear side of the mobile terminal body, and the second acoustic output part 152b may be provided not in the side surface of the mobile terminal body, but in the rear surface of the mobile terminal body.

The display 151 may display (output) information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, or an e-ink display.

The display 151 may be implemented as two display devices, according to an implementing form of the mobile terminal 100. In this case, a plurality of the displays may be arranged on one surface, either spaced apart from each other, or these devices may be integrated, or these devices may be arranged on different surfaces.

In order to receive a control command in a touching manner, the display 151 may include a touch sensor for sensing a touch input received at the display 151. When a touch is input to the display 151, the touch sensor may sense the touch and the controller 180 may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display (not shown) at a rear side of the window 151a, or a metal wire which is patterned directly on the rear surface of the window 151a. Alternatively, the touch sensor may be integrally formed with the display. For example, the touch sensor may be disposed on a substrate of the display or within the display.

As such, the display 151 may also form a touch screen together with the touch sensor. In this case, the touch screen may serve as the user input part 123 (see FIG. 1A). In some cases, the touch screen may replace at least some of the functions of the first manipulating part 123a and the second manipulating part 123b.

The first acoustic output part 152a may be implemented in the form of a receiver that delivers voice audio to a user's ear, and the second acoustic output part 152b may be implemented in the form of a loud speaker that outputs various alarm sounds or multimedia audio reproduction.

An aperture for releasing audio generated by the first acoustic output part 152a may be formed in the window 151a of the display 151. However, aspects of the present disclosure are not limited thereto, and audio may be released along an assembly gap between structural bodies (for example, a gap between the window 151a and the front case 101). In this case, a hole independently formed to output audio sounds may not be seen or may be hidden in terms of appearance, thereby further simplifying the appearance of the mobile terminal 100.

The optical output part 154 is configured to output light for indicating occurrence of an event. Examples of such events include a message reception, a call signal reception, a missed call, an alarm, a schedule notice, an email reception, information reception through an application, and the like. When a user has checked a generated event, the controller 180 can control the optical output part 154 to stop outputting light.

The first camera 121a processes image frames such as still or moving images obtained by the image sensor in a capture mode or a video call mode. The processed image frames may be displayed on the display 151 and may be stored in the memory 170.

The first and second manipulating parts 123a and 123b are examples of the user input part 123 that is manipulated to receive a command for controlling operation of the mobile terminal 100. The first and second manipulating parts 123a and 123b may employ any tactile method that allows the user to perform manipulation such as touch, push, scroll, or the like. In addition, the first and second manipulating parts 123a and 123b may employ any non-tactile method that allows the user to perform manipulation such as proximity touch, hovering, or the like.

The first and second manipulating parts 123a and 123b may be in the form of a mechanical key or a combination of a touch key and a mechanical key. In addition, the first and second manipulating parts 123a and 123b may be in the form layered with a finger scan sensor.

Input to be received by the first and second manipulating parts 123a and 123b may be set in various ways. For example, an input to a menu, a home key, cancellation, search, or the like may be input, and an input to control a volume level being output from the first or second acoustic output part 152a or 152b, to switch to a touch recognition mode of the display 151, or the like may be input.

As another example of the user input part 123, the first manipulating part 123a may be located at the rear side of the mobile terminal body. The first manipulating part 123a is manipulated to receive an input for controlling operation of the mobile terminal 100. The input may be set in a variety of different ways. For example, the first manipulating part 123a may receive an input for power on/off, start, end, scroll, control volume level being output from the first or second acoustic output part 152a or 152b, switch to a touch recognition mode of the display 151, and the like. The first manipulating part 123a may be configured to allow a touch input, a push input, or combinations thereof.

The first manipulating part 123a may be located to overlap the display 151 of the front side in a thickness direction of the mobile terminal body. In one example, the first manipulating part 123a may be located on an upper end portion of the rear side of the mobile terminal body such that a user can easily manipulate it using a forefinger when the user grabs the mobile terminal body with one hand. However, aspects of the present disclosure are not limited thereto, and the position of the first manipulating part 123a may change.

As such, when the first manipulating part 123a is provided at the rear side of the mobile terminal body, a new type of user interface may be implemented using the rear input part. In addition, the display 151 may be in the form of a larger screen.

Meanwhile, the mobile terminal 100 may include a finger scan sensor for recognizing a user's fingerprint. The controller 180 may use fingerprint information sensed by the finger scan sensor as part of an authentication procedure. The finger scan sensor may be embedded in the display 151 in the user input part 123.

The microphone 122 is configured to receive a user's voice, other sound, and the like. The microphone 122 may be provided in plural to receive stereo sound.

The interface 160 serves as a path allowing the mobile terminal 100 to interface with an external device. For example, the interface 160 may include one or more of a connection mobile terminal for connecting to another device (e.g., an earphone, an external speaker, or the like), a port for near field communication (e.g., an infrared data association (IrDA) port, a Bluetooth port, a wireless LAN port, and the like), or a power supply port for supplying power to the mobile terminal 100. The interface 160 may be implemented in the form of a socket for accommodating an external card, such as a subscriber identification module (SIM), a user identity module (UIM), or a memory card for information storage.

The second camera 121b may be located at the rear side of the mobile terminal body. In this case, the second camera 121b may have an image capturing direction substantially opposite to that of the first camera 121a.

The second camera 121b may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

The flash 124 may be located adjacent to the second camera 121b. When an image of a subject is captured with the second camera 121b, the flash 124 may illuminate the subject.

The second acoustic output part 152b may be additionally arranged in the mobile terminal body. The second acoustic output part 152b may implement stereophonic sound functions in conjunction with the first acoustic output part 152a, and may be also used for implementing a speaker phone mode for call communication.

At least one antenna for wireless communication may be located on the mobile terminal body. The antenna may be installed in the mobile terminal body or formed by the case. For example, an antenna which configures a part of the broadcast receiver 111 (see FIG. 1A) may be retractable into the mobile terminal body. Alternatively, an antenna may be in the form of a film attached to an inner surface of the rear cover 103 or in the form of a case including a conductive material.

The power supply 190 (see FIG. 1A) for supplying power to the mobile terminal 100 may be provided at the mobile terminal body. The power supply 190 may include a battery 191 embedded in the mobile terminal body or detachably coupled to an outside of the mobile terminal body.

The battery 191 may be configured to receive power via a power source cable connected to the interface 160. Also, the battery 191 may be configured to be recharged in a wireless manner using a wireless charger. Wireless charging may be implemented by magnetic induction (electromagnetic resonance).

Meanwhile, in the drawing, the rear cover 103 is coupled to the rear case 102 for shielding the battery 191, to prevent separation of the battery 191, and to protect the battery 191 from an external impact or from foreign material. When the battery 191 is detachable from the mobile terminal body, the rear case 103 may be detachably coupled to the rear case 102.

An accessory for protecting an appearance or assisting or extending the functions of the mobile terminal 100 may also be provided on the mobile terminal 100. As an example, the accessory may be a cover or pouch for covering or accommodating at least one surface of the mobile terminal 100. The cover or pouch may cooperate with the display 151 to extend the function of the mobile terminal 100. As another example, the accessory may be a touch pen for assisting or extending a touch input to a touch screen.

In the present disclosure, information processed in the mobile terminal may be displayed on a flexible display. Related examples are described in greater detail with reference to the accompanying drawings.

Figure 2:
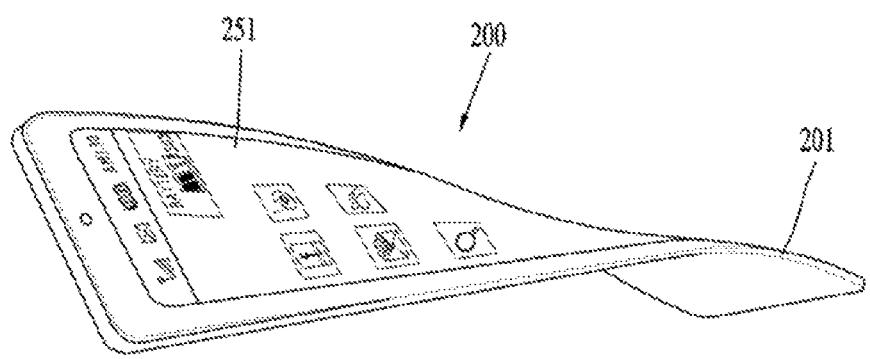
FIG. 2 is a conceptual diagram illustrating another example of a mobile terminal that is deformable according to the present disclosure.

FIG. 2 is a conceptual diagram illustrating an example of a mobile terminal 200 that is deformable according to the present disclosure.

As illustrated, a display 251 may be configured to be deformable by an external force. The deformation may be at least one of bowing, bending, folding, twisting, and rolling of the display 251. The deformable display 251 may be referred to as a "flexible display" or a "bendable display." Here, the flexible display 251 may include a general flexible display, e-paper, and a combination thereof. In general, the mobile terminal 200 may include features the same as or similar to those of the mobile terminal 100 of FIGS. 1A through 1C.

A general flexible display refers to a solid display manufactured on a thin, pliable substrate which is bowable, bendable, foldable, and twistable, or rollable, so as to be light and not easily brittle, while maintaining characteristics of an existing flat panel display.

Also, the e-paper, based on a display technology employing features of a general ink, may be different from an existing flat panel display in that it uses reflected light. In e-paper, information may be changed using electrophoresis using a twist ball or a capsule.

In a state in which the flexible display 251 is not deformed (for example, a state in which the display 151 has an infinite radius of curvature, which is referred to as a "first state", hereinafter), a display region of the flexible display 251 is flat. In a state in which the flexible display 251 in the first state is deformed by the external force (for example, a state in which the flexible display 251 as a finite radius of curvature, which will be referred to as a "second state", hereinafter), the display region may be curved. As illustrated, information displayed in the second state may be visual information output on the curved surface. The visual information is implemented as light emission of unit pixels (or subpixels) disposed in a matrix form is independently controlled. The subpixel refers to a minimum unit for implementing a single color.

The flexible display 251 may be placed in a bent state (for example, a vertically or horizontally bent state), not a flat state, from the first state. In this case, when an external force is applied to the flexible display 251, the flexible display unit 251 may be deformed to a flat state (or a less bent state) or more bent state.

Meanwhile, the flexible display 251 may be combined with a touch sensor to implement a touch screen. When a touch is applied to the touch screen, the controller 180 (see FIG. 1A) may perform a control corresponding to the touch input. The touch screen may be configured to sense a touch input even in the second state as well as in the first state.

The mobile terminal 200 may include a deformation sensing part that detects a deformation of the flexible display 251. The deformation sensing part may be included in the sensing part 140 of FIG. 1A.

The deformation sensing part may be provided in the flexible display 251 or a case 201 to sense information related to the deformation of the flexible display 251. The information related to the deformation may include, for example, a direction in which the flexible display is deformed, a degree of deformation, a deformed position, a deformation time, and an acceleration at which the deformed flexible display 251 is restored. In addition, the information related to the deformation may be various information to be detected in response to the flexible display 251 being bent.

Also, based on the information related to the deformation of the flexible display 251 detected by the deformation sensing part, the controller 180 may change information displayed on the flexible display 251 or generate a control signal for controlling functions of the mobile terminal 200.

Meanwhile, the mobile terminal 200 according to the modified example may include the case 201 accommodating the flexible display 251. The case 201 may be configured to be deformable along with the flexible display 251 by an external force in consideration of characteristics of the flexible display 251.

In addition, a battery (not shown) provided in the mobile terminal 200 may also be configured to be deformable along with the flexible display 251 by an external force in consideration of characteristics of the flexible display 251. In order to implement the battery, a stack-and-folding scheme in which battery cells are piled upwardly may be applied.

State deformation of the flexible display 251 is not limited to state information based on an external force. For example, the flexible display 251 in the first state may be deformed to the second state by a user command or a command of an application.

Meanwhile, in overall example embodiments, a notification UI may be a UI for displaying notification information provided in an application of a mobile terminal. Accordingly, notification information provided by a plurality of applications installed in the mobile terminal may be displayed in the notification UI, so that interaction with an application providing notification is conducted in response to an input corresponding to the notification information. In addition, icons provided through the notification UI may be used to change settings in the mobile terminal.

FIG. 3 is a conceptual diagram illustrating a mobile terminal according to an example embodiment of the present disclosure.

Reference numerals 310 and 320 of FIG. 3 indicate an example of displaying input UIs 315 and 332 on a display of the mobile terminal in response to first inputs 301 and 331 of a user being received.

As indicated by the reference numeral 310, the first input 301 may be received in at least a portion of a first area 311 of the mobile terminal. In this case, the mobile terminal may identify content displayed in the first area 311 based on a reception of the first input 301. The mobile terminal may display a notification UI 315 based on a setting related to a notification UI display of the identified content. Specifically, in the reference numeral 310, the setting related to the notification UI display of the content displayed in the first area 311 may correspond to a first setting. In this case, the mobile terminal may display the notification UI 315 in a second area 312 distinguished from the first area 311 as indicated by the reference numeral 310.

Here, the first setting may include a setting for restricting the notification UI display and include, for example, a setting for preventing the notification UI from being displayed by overlapping on top. Accordingly, as indicated by the reference numeral 310, the notification UI display may be omitted in the first area 311 in which the content corresponding to the first setting is displayed.

As indicated by the reference numeral 320, the first input 331 may be received in at least a portion of a first area 321 of the mobile terminal. In this case, the mobile terminal may identify content displayed in the first area 321 distinguished from a second area 322 based on a reception of the first input 331. The mobile terminal may display the notification UI 315 based on a setting related to a notification UI display of the identified content.

Specifically, in the reference numeral 320, the setting related to the notification UI display of the identified content may correspond to a second setting. The second setting may include a setting that does not restrict the notification UI and include, for example, a setting for displaying the notification UI by overlapping on top. In this case, as indicated by the reference numeral 320, a notification UI 332 may be displayed in the first area 321 in which first content corresponding to the second setting is displayed.

In the example embodiment, the settings related to displaying the notification UIs 315 and 332 may be designated for each content. Depending on embodiments, the notification UIs 315 and 332 may be displayed in various ways. Related description will be described in detail later.

Figure 4:
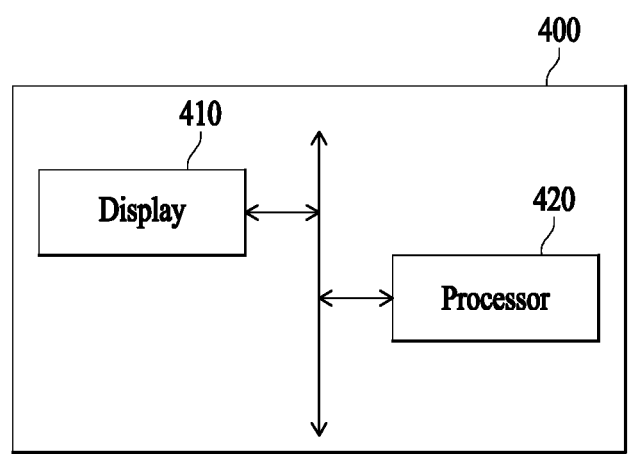
FIG. 4 is a functional block diagram of a mobile terminal according to an example embodiment of the present disclosure.

FIG. 4 is a functional block diagram of a mobile terminal according to an example embodiment of the present disclosure. As described below, an element of a mobile terminal 400 may be a unit that processes at least one function or operation and may be implemented through hardware, software, or a combination of hardware and software.

Referring to FIG. 4, the mobile terminal 400 may include a display 410 and a processor 420.

The display 410 may display various information. In an example, the display 410 may display a notification UI. The notification UI may include, for example, at least one icon for controlling an operation of the mobile terminal 400 and notification information generated by an application installed in the mobile terminal 400. The notification UI may also be referred to as, for example, a notification bar, a state bar, a pop-up notification, or a notification window but is not limited by such terminologies. An example of the notification UI will be described in detail with reference to FIG. 11. The notification information may be information provided by an application through a push message and include, for example, information provided in a type such as an image or text.

The display 410 may correspond to the display 151 of FIG. 1 and redundant description will be omitted.

The processor 420 may control an operation of the mobile terminal 400. Specifically, the processor 420 may be connected to various components (e.g., the display 410) of the mobile terminal 400 to control the operation of the mobile terminal 400. As to this, it is apparent to those skilled in the art, redundant description will be omitted.

The processor 420 may receive a first input related to a notification UI display on a first area in which first content is displayed. In the example embodiment, in a state in which the first content is displayed in the first area of the display 410 and second content is displayed in a second area of the display 410, the processor 420 may receive the first input related to the notification UI display on the first area. The first input may include a user's input, for example, a touch input or drag input (e.g., drag input having a specific direction) to a specific portion (e.g., an area corresponding to a top bar) of the first area.

Here, the first area may be an area of the display 410 distinguished from the second area. Also, contents of different applications may be displayed in the first area and the second area. For example, the first content of a first application may be displayed in the first area and the second content of a second application may be displayed in the second area.

When the setting (or notification setting) related to the notification UI display of the first content corresponds to a first setting, the processor 420 may display a notification UI in the second area of the display 410 distinguished from the first area in response to the first input. Here, the first setting may include a setting for restricting the display of the notification UI such that the notification UI is displayed not to overlap the first content.

In the example embodiment, when the first input is received, the processor 420 may identify the setting related to the notification UI display of the first content displayed in an area in which the first input is received, that is, the first area. When the setting related to the notification UI display of the first content corresponds to the first setting, the processor 420 may display the notification UI in the second area distinguished from the first area in which the first content is displayed.

In some cases, the setting related to the notification UI display of the first content may correspond to the second setting. In such cases, the processor 420 may display the notification UI in at least a portion of the first area in response to the first input. Here, the second setting may include a setting for displaying the notification UI to overlap the first content.

In the example embodiment, the setting related to the notification UI display may be set for each content or for each application corresponding to the content. For example, the setting related to the notification UI display of the first content or a first application corresponding to the first content may include the first setting. The setting related to the notification UI display of the second content or a second application corresponding to the second content may include the second setting.

In the example embodiment, the setting related to the notification UI display may be set for each type of content in advance. In this case, the processor 420 may display the notification UI based on the setting related to the notification UI display according to a content type corresponding to a type of the first content. Specifically, the processor 420 may identify the type of the first content in response to the first input and identify the setting related to the notification UI display according to the type of the first content. The processor 420 may display the notification UI in the first area or the second area based on the identified setting.

Here, the content type may include at least one of visual content, auditory content, and general content. The visual content may be content that provides visual information and may include, for example, image content or video content. The auditory content may be content that provides auditory information and may include, for example, music content or radio content. The general content may include contents other than the visual content and the auditory content. In some cases, content corresponding to each of the visual content, the auditory content, and the general content may be designated in advance, and an example different from the foregoing example may also be included.

In the example embodiment, the content type may be designated based on a type of application. For example, a content type related to a video application may correspond to the visual content. A content type related to a music application may correspond to the auditory content. A content type related to other (other than the visual content and the auditory content) applications may correspond to the general content. Here, content related to a specific application (e.g., video application, music application) may include content provided based on an execution of the specific application, and a content type for each application is not limited to the foregoing example.

In the example embodiment, a setting related to a notification UI display for each content type may be designated based on an input of a user. For example, a setting related to a notification UI display of first type content may be designated to be the first setting by a user's input and a setting related to a notification UI display of second type content may be designated to be the second setting by a user's input. A related example will be described in detail with reference to FIG. 16. Also, in some cases, a setting related to a display of a notification UI may be designated for each application by a user's input, and a related example will be described in detail with reference to FIG. 15.

In the example embodiment, when the first input is received, the processor 420 may identify a moving speed of the first input. The processor 420 may change a display speed of the notification UI based on the moving speed of the first input. For example, when the first input is a drag input having a first speed, the processor 420 may display the notification UI at the first speed. That is, the display speed of the notification UI displayed in the first area or the second area may be changed based on the moving speed of the first input. In this case, the notification UI may be implemented to be unfolded with the first speed from one end (e.g., top) of the first area or the second area to the other end (e.g., bottom). However, it is merely an example, and the display of the notification UI may be implemented in various ways.

In the example embodiment, the processor 420 may display the notification UI according to a notification UI type identified based on a size of an area (e.g., the second area) in which the notification UI is to be displayed. For example, when the notification UI is displayed in the second area based on a case in which the setting related to the notification UI display of the first content displayed in the first area is the first setting, the processor 420 may identify a size of the second area. The processor 420 may display the notification UI on at least a portion of the second content displayed in the second area according to the notification UI type corresponding to the identified size of the second area.

The notification UI type may be designated for each size of an area in advance. For example, a notification UI type corresponding to an area of a first size may include a first type, and a notification UI type corresponding to an area of a second size may include a second type.

In the example embodiment, when the first size is greater than the second size, the notification UI displayed according to the first type corresponding to the first size may display a greater number of icons compared to the notification UI displayed according to the second type corresponding to the second size. However, it is merely an example, and a predetermined number of icons or a predetermined size of an icon may be displayed based on a type.

In some cases, a displayed icon or displayed type for each notification UI type may be designated by a user's setting in advance. For example, an icon or information to be included in a notification UI of a specific type (e.g., the first type, the second type) may be determined based on an input of a user. A related example will be described in detail with reference to FIG. 12.

In the example embodiment, when a size of an area in which the notification UI is displayed is greater than a threshold size, the processor 420 may display the notification UI according to the first type. When a size of an area in which the notification UI is displayed is less than a threshold size, the processor 420 may display the notification UI according to the second type.

In the example embodiment, the processor 420 may change a display scheme of the notification UI in response to a change in size of an area (e.g., the second area) in which the notification UI is displayed. Specifically, the processor 420 may sense a change in size of at least one of the first area and the second area. When the notification UI is displayed in the second area, the processor 420 may change the display scheme of the notification UI in response to a size change of the second area being detected.

In the example embodiment, the display scheme of the notification UI may include a type of the notification UI. In this case, the changing of the display scheme of the notification UI may include, for example, changing the type of the notification UI from the second type to the first type. A related example will be described in detail with reference to FIG. 13.

In some cases, the notification UI may include a button icon for changing a size of the notification UI. The processor 420 may change the size of the notification UI in response to an input to the button icon being received. For example, when the input to the button icon is received in a state in which the notification UI of the first type having the first size is displayed, the processor 420 may change the notification UI to be in the second size. A related example will be described in detail with reference to FIG. 14.

In the example embodiment, the setting related to the notification UI display of each of the first content displayed in the first area and the second content displayed in the second area may correspond to the first setting. In this case, the processor 420 may display predetermined guide information in at least a portion of the first area and the second area. The predetermined guide information may be information indicating that both the first content and the second content correspond to the first setting, and may include at least one of, for example, a specific text, a specific sound, a vibration of a specific pattern, and a specific image. A related example will be described in detail with reference to FIG. 8.

In the example embodiment, when the setting related to the notification UI display of the second content displayed in the second area corresponds to the first setting, the processor 420 may display the notification UI on at least a portion of the first content. Specifically, when the setting related to the notification UI display of the first content corresponding to the first input corresponds to the first setting, the processor 420 may identify the setting related to the notification UI display of the second content displayed in the second area. In some cases, the setting related to the notification UI display of the second content may also correspond to the first setting. In such cases, the processor 420 may display the notification UI on at least a portion of the first content. Accordingly, the notification UI may be displayed on the first content to overlap thereon.

In the example embodiment, when the setting related to the notification UI display of the second content displayed in the second area corresponds to the first setting, the processor 420 may display at least one of the second content displayed in the first content and the second area with a reduced size. The processor 420 may display the notification UI in a third area defined in accordance with at least one of the first content and the second content being displayed with a reduced size. Specifically, when the setting related to the notification UI display of the first content corresponding to the first input corresponds to the first setting, the processor 420 may identify the setting related to the notification UI display of the second content displayed in the second area. If the setting related to the notification UI display of the second content also corresponds to the first setting, the processor 420 may display at least one of the second content displayed in the first content and the second area with a reduced size. In this case, the processor 420 may display the notification UI in the newly prepared third area of the display 410. The third area may include an area that has been occupied by at least a portion of the first area and the second area. A related example will be described in detail with reference to FIG. 9 or 10.

In the example embodiment, a plurality of contents may be displayed in the second area. In this case, the processor 420 may display the notification UI on at least a portion of content corresponding to one of the plurality of contents, based on a setting related to a notification UI display corresponding to each of the plurality of contents. For example, when the second content and third content are displayed in the second area, the processor 420 may identify the setting related to the notification UI display of each of the second content and the third content. The processor 420 may identify content of which a setting related to a notification UI display corresponds to the first setting, from the second content and the third content. Also, the processor 420 may display the notification UI to overlap at least a portion of the identified content.

In the example embodiment, when the second content and the third content are displayed in the second area, the processor 420 may display the notification UI to overlap at least a portion of content corresponding to one of the second content and the third content, based on priority information determined based on at least one of positions in which the second content and the third content are displayed and types of the second content and the third content.

As an example, when the second content is displayed on a top of the second area and then the third content is displayed, the second content may have a higher priority compared to the third content. That is, priority information may be set such that content displayed at a position adjacent to a top bar has a higher priority. In this case, the processor 420 may display the notification UI to overlap at least a portion of the second content having a higher priority.

As another example, when a type of the second content corresponds to the first type and a type of the third content corresponds to the second type, the second content may have a higher priority compared to the third content. That is, priority information may be set such that a priority of the first type is higher than a priority of the second type. In this case, the processor 420 may display the notification UI to overlap at least a portion of the second content having a higher priority.

In the example embodiment, a position in which the notification UI is displayed in a specific area (e.g., the first area or the second area) may be designated in advance. For example, a displayed position of the notification UI may be designated such that the notification UI is displayed to be adjacent to atop of the specific area. Also, in some cases, the notification UI may be designated to be displayed based on a specific animation pattern. For example, the notification UI may be designated to be displayed in a form of unfolding from top to bottom.

Figure 5:
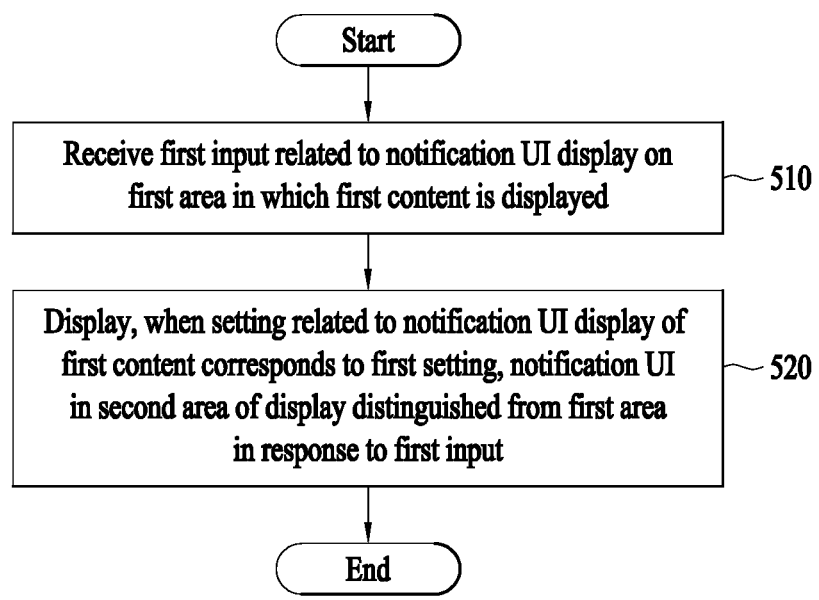
FIG. 5 is a flowchart illustrating operations of a control method of a mobile terminal according to an example embodiment of the present disclosure.

FIG. 5 is a flowchart illustrating operations of a control method of a mobile terminal according to an example embodiment of the present disclosure. Operations illustrated in FIG. 5 may be performed in different orders or irrespective of an order depending on cases. Since the descriptions made with reference to FIGS. 1A through 4 are also applicable here, repeated description of FIG. 5 will be omitted.

Referring to FIG. 5, in operation 510, the mobile terminal may receive a first input related to a notification UI display on a first area in which first content is displayed. For example, the mobile terminal may receive the first input corresponding to a first position of the first area in which the first content is displayed. The first input may include, for example, a touch input or drag input but is not limited thereto.

The mobile terminal may identify the first content displayed in the first area in response to the first input being received. The mobile terminal may identify the setting related to the notification UI display of the first content. The setting related to the notification UI display may include the first setting or the second setting. For example, the first setting may include a setting for restricting the display (or overlapping display) of the notification UI on the corresponding content. The second setting may include a setting for allowing the notification UI to be displayed on the corresponding content.

In operation 520, when the setting related to the notification UI display of the first content corresponds to the first setting, the mobile terminal may display the notification UI in the second area of the display distinguished from the first area in response to the first input.

In the example embodiment, when the setting related to the notification UI display of the first content corresponds to the first setting, the mobile terminal may identify the setting related to the notification UI display of the second content displayed in the second area. When the setting related to the notification UI display of the second content corresponds to the second setting, the mobile terminal may display the notification UI on at least a portion of the second area in which the second content is displayed.

In some cases, a plurality of contents may be displayed in the second area. In such cases, the mobile terminal may identify content having the second setting among the plurality of contents. The mobile terminal may display the notification UI in at least a portion of an area in which the content having the second setting is displayed. In this instance, a position at which the notification UI is displayed may be designated in advance. A related example will be described in detail with reference to FIG. 6 or 7.

In one example embodiment, when the setting related to the notification UI display of the second content corresponds to the first setting, the mobile terminal may display the notification UI on at least a portion of the first area. That is, when the second content corresponds to the first setting, the mobile terminal may display the notification UI in the first area in which the first input is received.

In another example embodiment, when the setting related to the notification UI display of the second content corresponds to the first setting, the mobile terminal may display predetermined guide information in at least a portion of the first area and the second area. The predetermined guide information may include at least one of a specific text, a specific sound, a vibration of a specific pattern, and a specific image. A related example will be described in detail with reference to FIG. 8.

In another example embodiment, when the setting related to the notification UI display of the second content corresponds to the first setting, the mobile terminal may display the notification UI in the third area prepared by reducing a size of at least a portion of the first area and the second area. Here, the third area may include an area prepared in response to the size reduction. When a size of the first area is reduced, a size of the first content may be reduced in response to the size reduction. Also, when a size of the second area is reduced, a size of the second content may be reduced in response to the size reduction. However, it is merely an example, a portion of the first content may be displayed in response to the size reduction of the first area and a portion of the second content may be displayed in response to the size reduction of the second area. A related example will be described in detail with reference to FIG. 9 or 10.

In the example embodiment, sizes of contents displayed on the display or areas (e.g., the first area, the second area) corresponding to the contents may be different. In this case, the mobile terminal may display the notification UI based on a size of each content (or area corresponding to each content). For example, when a size of the second area in which the notification UI is to be displayed is the first size, the mobile terminal may display the notification UI of the first type in the second area. When a size of the second area is the second size, the mobile terminal may display the notification UI of the second type in the second area. In this instance, a type of the notification UI for each size may be designated in advance.

Types of the notification UI may be set to have different sizes. For example, the first type may correspond to the first size and the second type may correspond to the second size. A related example will be described in detail with reference to FIG. 13.

In some cases, different icon or notification information may be included for each type. In such cases, icon or notification information included for each type according to the example embodiment may be designated based on an input of a user. A related example will be described in detail with reference to FIG. 11 or 12.

Figure 6:
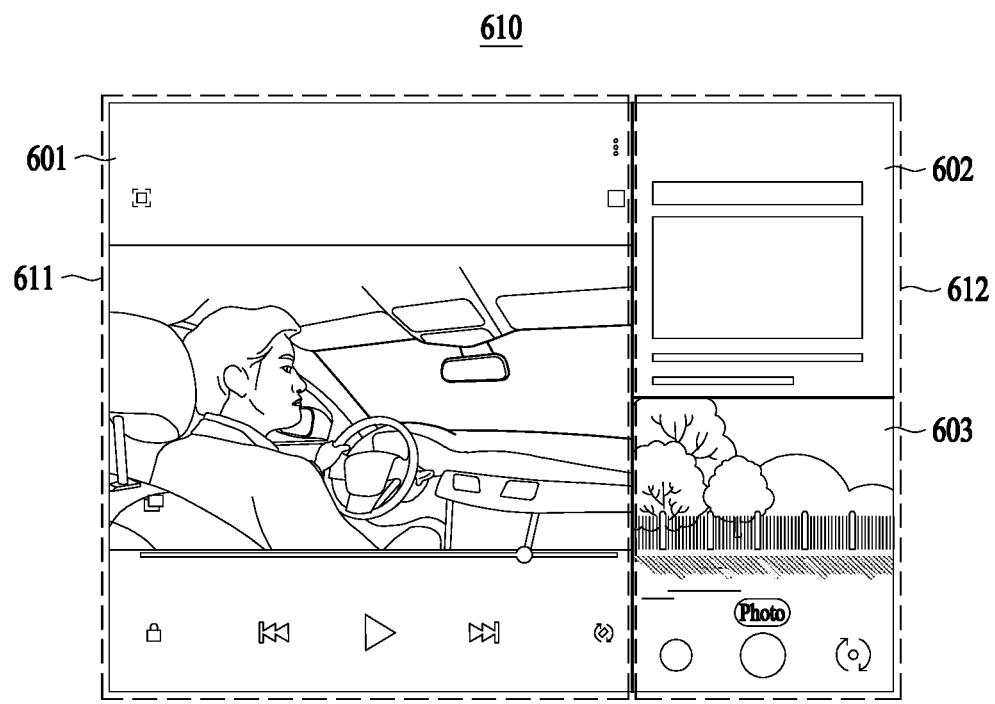
FIG. 6 is a diagram illustrating an example of displaying a notification user interface (UI) in response to an input being received in a mobile terminal according to an example embodiment of the present disclosure.
Figure 6:
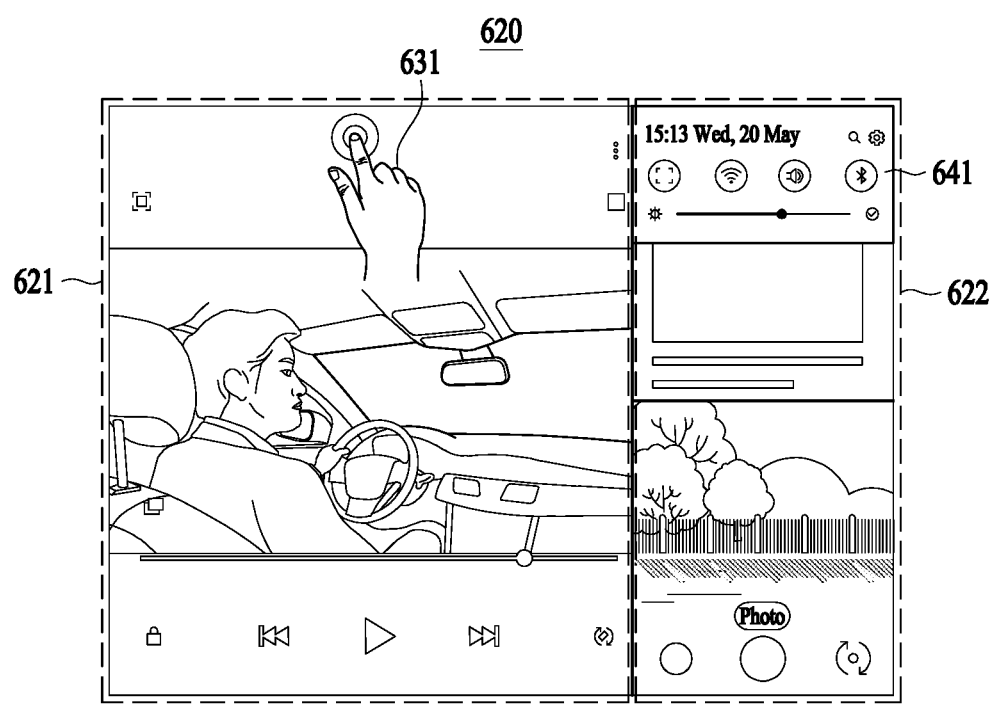

FIG. 6 is a diagram illustrating an example of displaying a notification UI in response to an input being received in a mobile terminal according to an example embodiment of the present disclosure. Specifically, FIG. 6 illustrates an example of displaying a notification UI when a plurality of contents is displayed in a second area.

Reference numeral 610 of FIG. 6 indicates a first area 611 including first content 601 and a second area 612 including second content 602 and third content 603. As indicated by the reference numeral 610, the first content 601 may include content provided by a video application. The second content 602 may include content provided by a setting application. The third content may include content provided by a camera application. In this case, a setting related to a notification UI display of the first content 601 and the third content 603 may correspond to a first setting. Also, a setting related to a notification UI display of the second content 602 may correspond to a second setting.

Referring to reference numeral 620, a first input 631 may be received in at least a portion of a first area 621. The first input 631 may include an input related to a display of a notification UI. Specifically, the first input 631 may include an input for requesting the notification UI to be displayed. For example, the first input 631 may include a touch input or drag input to a specific area (e.g., area in which a top bar is displayed) of the first area 621.

When the first input 631 is received, the mobile terminal may perform an operation for displaying the notification UI. Specifically, when the first input 631 is received, the mobile terminal may identify a position to which the first input 631 is applied and identify content corresponding to the identified position, for example, content displayed in the first area 621.

The mobile terminal may identify a setting related to a notification UI display of the identified content. When the identified setting is the first setting, the mobile terminal may display the notification UI in an area where content of which the setting related to the notification UI display corresponds to the second setting is displayed. For example, as indicated by the reference numeral 620, a notification UI 641 may be displayed in a portion in which the second content corresponding to the second setting is displayed, of a second area 622.

As illustrated, the notification UI 641 may be displayed to overlap content. In this instance, previously displayed content, that is, at least a portion of the second content may be obscured by the notification UI 641.

Figure 7:
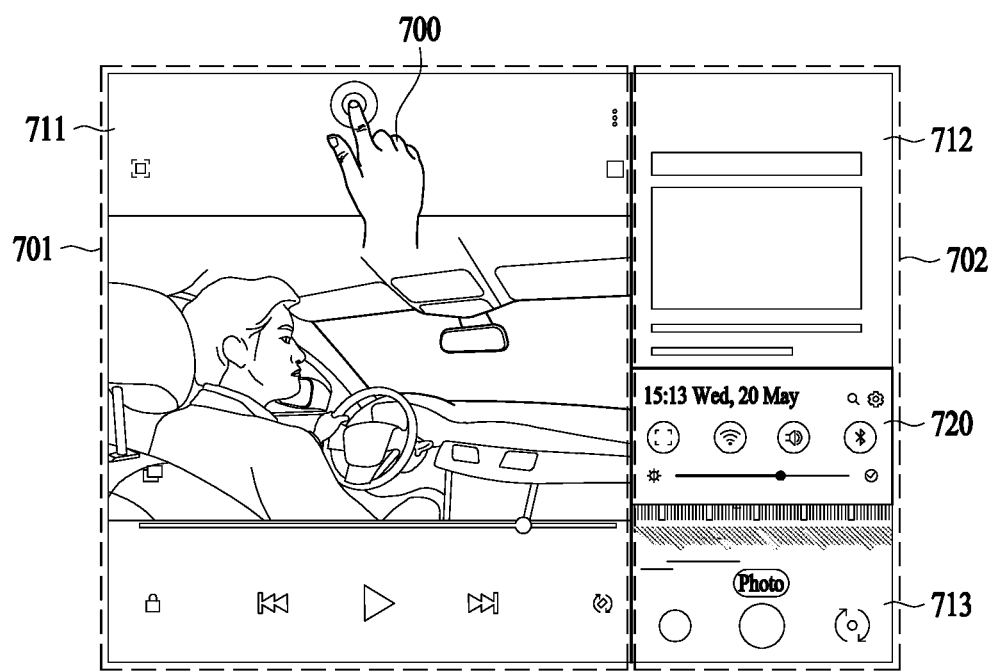
FIG. 7 is a diagram illustrating another example of displaying a notification UI in response to an input being received in a mobile terminal according to an example embodiment of the present disclosure.

FIG. 7 is a diagram illustrating another example of displaying a notification UI in response to an input being received in a mobile terminal according to an example embodiment of the present disclosure. Specifically, FIG. 7 illustrates an example of displaying a notification UI when settings related to a notification UI display of first content 711 displayed in a first area 701 and second content 712 displayed in a second area 702 are a first setting and a setting related to a notification UI display of third content 713 displayed in the second area 702 is a second setting.

Referring to FIG. 7, a first input 700 may be received in at least a portion of the first area 701. In this instance, the first content 711 may be displayed in the first area 701, and the second content 712 and the third content 713 may be displayed in the second area. The first content 711 and the second content 712 may include contents of which the setting related to the notification UI display corresponds to the first setting. Also, the third content 713 may include content of which the setting related to the notification UI display corresponds to the second setting.

In this case, when the first input 700 for at least a portion of the first area 701 is received, the mobile terminal may identify the setting related to the notification UI display of the first content 711 displayed in the first area 701. When the setting related to the notification UI display of the first content 711 is the first setting, the mobile terminal may identify the setting related to the notification UI display of each content displayed in the second area and display the notification UI on at least a portion of content corresponding to the second setting, that is, the third content.

A position at which the notification UI is displayed may be adjacent to a top of the third content as illustrated but is not limited thereto. For example, a position at which the notification UI is displayed may be adjacent to one end on a left side of the third content.

FIGS. 6 and 7 may be based on a case in which the second content and the third content are displayed in the second area together. However, in some cases, an area in which the second content is displayed may be distinguished from an area in which the third content is displayed, so that the areas are referred to as different terms. The present disclosure is not limited by such terminologies.

In the example embodiment, when the first input (e.g., the first input 631 of FIG. 6, a first input 700 of FIG. 7) is received, the mobile terminal may identify an area in which the first input is received, and then identify content displayed in the identified area. In some cases, the mobile terminal may directly identify content corresponding to a position at which the first input is received without identifying the area. An order of these operations or omission of at least some operations may be changed within a variety of ranges in which design changes are possible by those skilled in the art. Also, in the example embodiments, the "first area" or the "second area" are terms for explaining by distinguishing areas in which contents are displayed, and thus, the present disclosure is not limited by such terminologies.

Although FIGS. 6 and 7 are based on a case in which the second content and the third content are arranged vertically, it is merely an example. The second content and the third content may be arranged in various ways, for example, horizontally.

Figure 8:
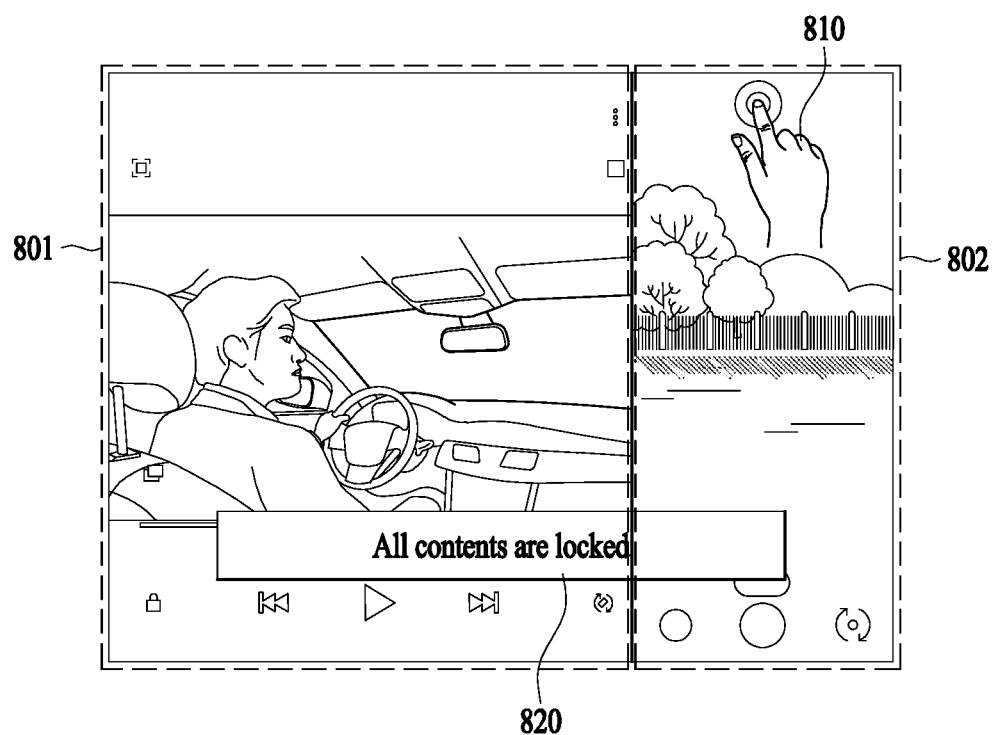
FIG. 8 is a diagram illustrating an example of displaying guide information in response to an input being received in a mobile terminal according to an example embodiment of the present disclosure.

FIG. 8 is a diagram illustrating an example of displaying guide information in response to an input being received in a mobile terminal according to an example embodiment of the present disclosure. Specifically, FIG. 8 illustrates an example of an operation performed by the mobile terminal when a setting related to a notification UI display of all contents displayed on a display is a first setting.

Referring to FIG. 8, contents displayed in a first area 801 and a second area 802 of a display of the mobile terminal may correspond to the first setting. In this case, the mobile terminal may display guide information 820 including information associated with the first setting in response to a first input 810 being received.

As illustrated, the guide information may be displayed in at least a portion of the first area 801 and the second area 802. However, it is merely an example, and the guide information may be displayed in various ways. For example, the guide information may include at least some of information in a form that a light source placed at an edge of the display emits in a specific light-emitting pattern, information in a form of playing a specific signal sound, and information in a form that a vibration of a specific pattern is generated.

Figure 9:
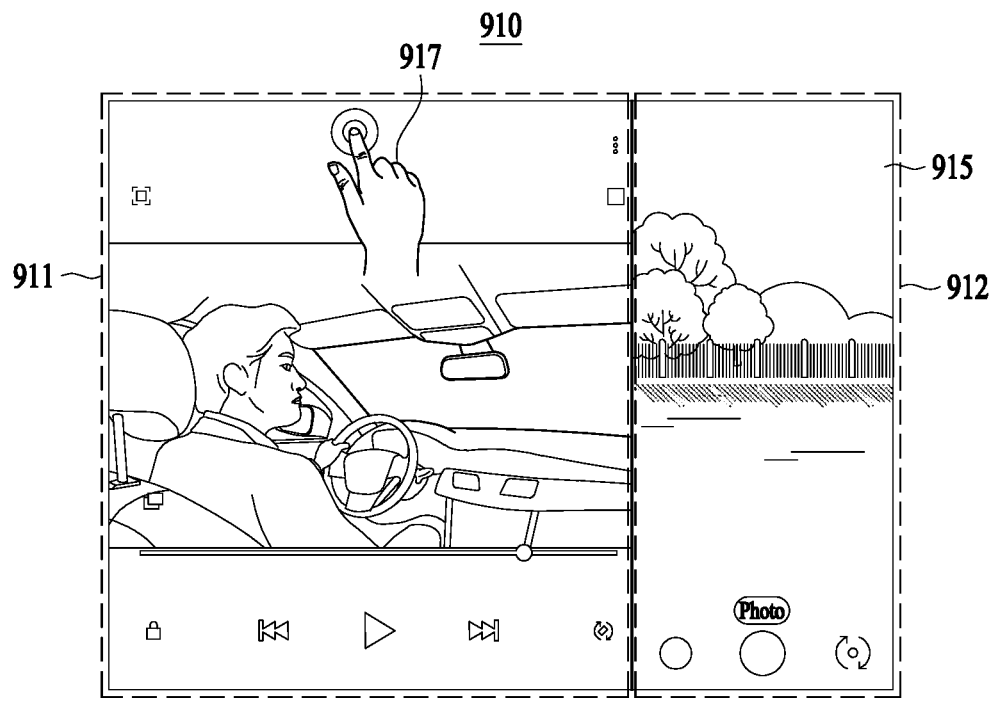
FIGS. 9 and 10 are diagrams illustrating another example of displaying a notification UI in response to an input being received in a mobile terminal according to an example embodiment of the present disclosure.
Figure 9:
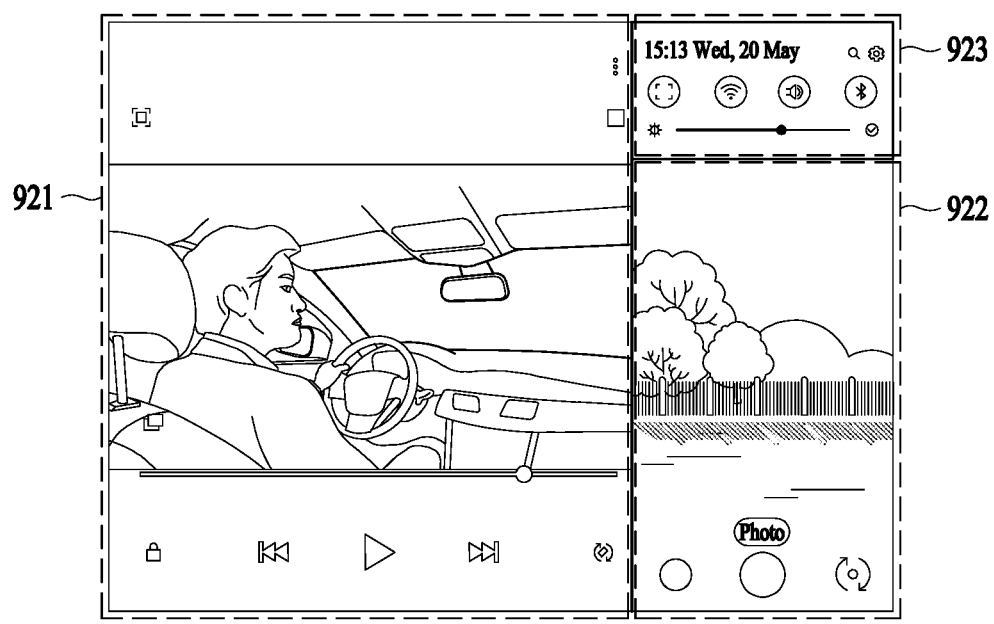
Figure 10:
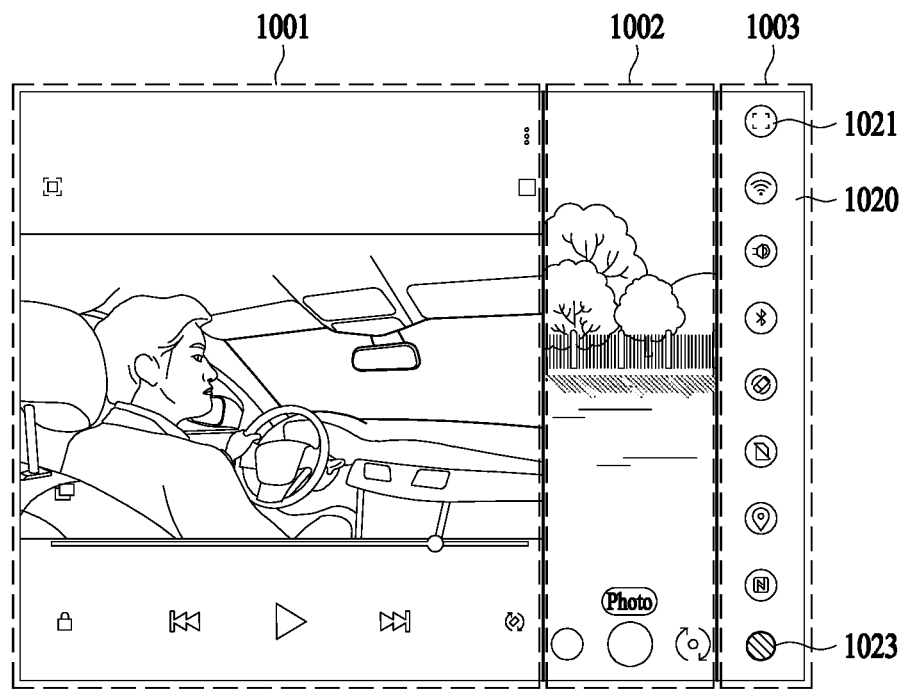

FIGS. 9 and 10 are diagrams illustrating another example of displaying a notification UI in response to an input being received in a mobile terminal according to an example embodiment of the present disclosure.

Specifically, FIGS. 9 and 10 illustrate an example of displaying a notification UI in a third area provided in accordance with a reduction of at least a portion of a first area and a second area (or contents displayed in the first area and the second area) when each of a plurality of contents displayed on a display corresponds to a first setting.

Reference numeral 910 of FIG. 9 indicates a case in which content corresponding to the first setting is displayed in each of a first area 911 and a second area 912. In this case, when a first input 917 is received in at least a portion of the first area 911, the mobile terminal may identify a setting related to a notification UI display of second content 915 displayed in the second area 912 since a setting of first content displayed in the first area 911 corresponds to a first setting. As described above, like the first content, the setting related to the notification UI display of the second content may correspond to the first setting. In this case, the mobile terminal may reduce a size of at least a portion of the first area 911 and the second area 912.

For example, the mobile terminal may reduce a size of the second area 912. In this example, a size of the second content 915 displayed in the second area 912 may also be reduced in response to the size reduction of the second area 912. Accordingly, a first area 921 and a second area 922 may be displayed as indicated by a reference numeral 920. A third area 923 may be prepared in response to the size reduction of the second area 922. The notification UI may be displayed in the third area 923. Meanwhile, the size of the first area 921 may be maintained but is not limited thereto.

Referring to the reference numeral 920, the mobile terminal may display a notification UI of a type corresponding to a size of the third area 923 in the third area 923. For example, the size of the third area 923 may be less than the size of the second area 312 in which the notification UI of FIG. 3 is displayed. In this example, the mobile terminal may identify a type of a notification UI corresponding to the size of the third area 923 and display the notification UI of the identified type in the third area 923.

FIG. 10 illustrates an example of performing a size reduction of a second area 1002 in which second content 1015 is displayed, in a different manner from that of FIG. 9. Specifically, referring to FIG. 10, the mobile terminal may display the second area with a reduced size in response to contents displayed in a first area 1001 and the second area of the display being a first setting. In this case, content displayed in the second area 1002 may also be displayed with a reduced size. In response to the second area being reduced, a third area 1003 may be prepared. Also, a notification UI 1020 may be displayed in the third area 1003.

As illustrated, the notification UI 1020 may include at least one icon (e.g., a first icon 1021) for controlling an operation of the mobile terminal.

The mobile terminal may display the notification UI 1020 corresponding to the size of the third area 1003. In this case, depending on an embodiment, the notification UI 1020 may include a size change icon 1023 for changing a display type of the notification UI 1020. When an input to the size change icon 1023 is received, the mobile terminal may change the notification UI 1020 to that of a predetermined type having a different size.

In the example embodiment, the notification UI displayed in response to the input to the size change icon 1023 may be displayed in the entire area of the display irrespective of settings related to a notification UI display of the first content and the second content.

Figure 11:
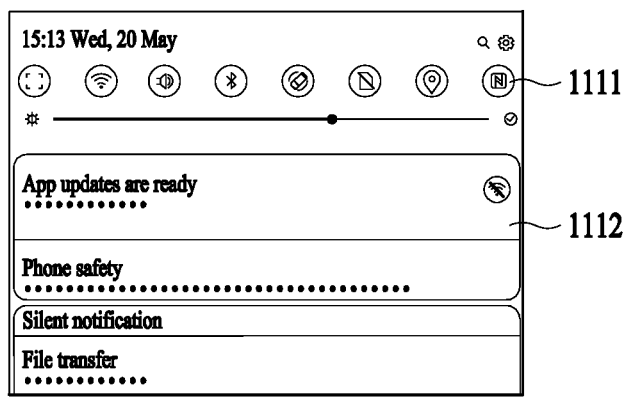
FIG. 11 is a diagram illustrating an example of a notification UI displayed on a mobile terminal according to an example embodiment of the present disclosure.
Figure 11:
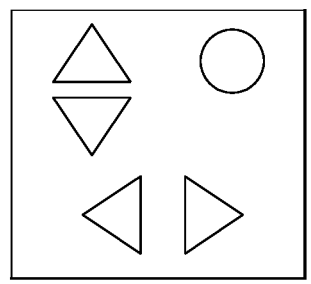
Figure 11:
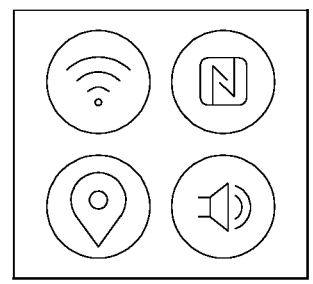

FIG. 11 is a diagram illustrating an example of a notification UI displayed on a mobile terminal according to an example embodiment of the present disclosure. Specifically, FIG. 11 illustrates an example of notification UIs of different types.

Reference numeral 1110 of FIG. 11 indicates a notification UI of a first type. Reference numeral 1120 indicates a notification UI of a second type. Reference numeral 1130 indicates a notification UI of a third type. The notification UI of the first type may be greater in size than the notification UI of the second type and the notification UI of the third type. In this case, the notification UI of the first type may include a greater number or type of icons (e.g., a first icon 1111) and notification information (e.g., first notification information 1112) compared to that of the notification UIs of the second type and the third type, but it is merely an example.

Depending on a case, icons included in the notification UI may be represented differently for each type of notification UI. For example, as indicated by the reference numeral 1120, an icon for controlling on/off of Wi-Fi may be represented in a circular shape in the notification UI of the second type. Also, as indicated by the reference numeral 1130, an icon for controlling on/off of Wi-Fi may be represented in a form of including an image representing Wi-Fi in the notification UI of the third type.

The icon included in the notification UI may include icons for controlling settings of, for example, Wi-Fi, a global positioning system (GPS), a near field communication (NFC) mode, a screen rotation mode, a brightness, a vibration mode, and Bluetooth. The notification information may include a message or information acquired from at least one application installed in the mobile terminal.

The notification UI may also be referred to as a "notification bar" or a "notification window" depending on an embodiment, and the present disclosure is not limited by such terminologies.

The mobile terminal may store information on a size for each type of notification UI. Depending on an embodiment, the mobile terminal may display a notification UI of a type corresponding to a size of an area in which the notification UI is displayed based on the information on the stored size.

In the example embodiment, at least some of the number and types of icons displayed in the notification UI may be determined based on an input of a user. A related example will be described in detail with reference to FIG. 12.

Figure 12:
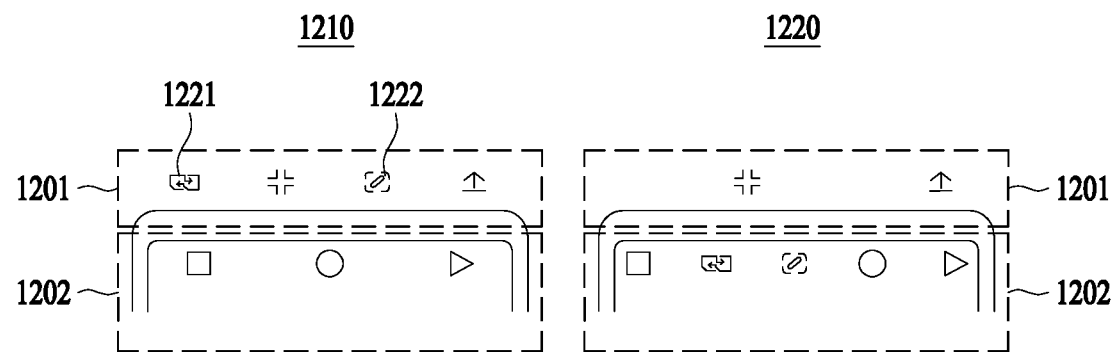
FIG. 12 is a diagram illustrating an example of setting a notification UI displayed on a mobile terminal according to an example embodiment of the present disclosure.

FIG. 12 is a diagram illustrating an example of setting a notification UI displayed on a mobile terminal according to an example embodiment of the present disclosure. Specifically, FIG. 12 illustrates a case in which an icon to be included in a notification UI is determined by an input of a user.

Reference numeral 1210 of FIG. 12 indicates icons to be inserted into a notification UI and icons already inserted in the notification UI. Specifically, icons listed in a first portion 1201 may include the icons to be inserted into the notification UI. Icons listed in a second portion 1202 may include the icons already inserted in the notification UI.

In the example embodiment, at least some icons, for example, a first icon 1221 and a second icon 1222 may be selected from the icons listed in the first portion 1201 based on an input of a user. In this case, as indicated by reference numeral 1220, a display of the first icon 1221 and the second icon 1222 may be omitted in the first portion 1201, and the first icon 1221 and the second icon 1222 may be added to and displayed in the second portion 1202.

The input of the user may include, for example, a drag input that moves from positions corresponding to the first icon 1221 and the second icon 1222 of the first portion 1201 to positions at which the first icon 1221 and the second icon 1222 of the second portion 1202 are to be placed.

In some cases, an arrangement of the icons inserted into the notification UI may be changed based on the input of the user. For example, an arrangement of the icons inserted into the notification UI may be changed based on a drag input of selecting an icon of the second portion 1202 and moving the selected icon to a desired position. In such cases, icons may be displayed at the changed positions in the notification UI when the notification UI is displayed.

Although an operation of determining an icon for a notification UI of one type has been described with reference to FIG. 12, embodiments are not limited thereto. For example, an icon to be displayed may be determined for each of the various types provided in the mobile terminal. In addition, the icons of FIG. 12 are merely an example, and the present disclosure is not limited to the example.

Figure 13:
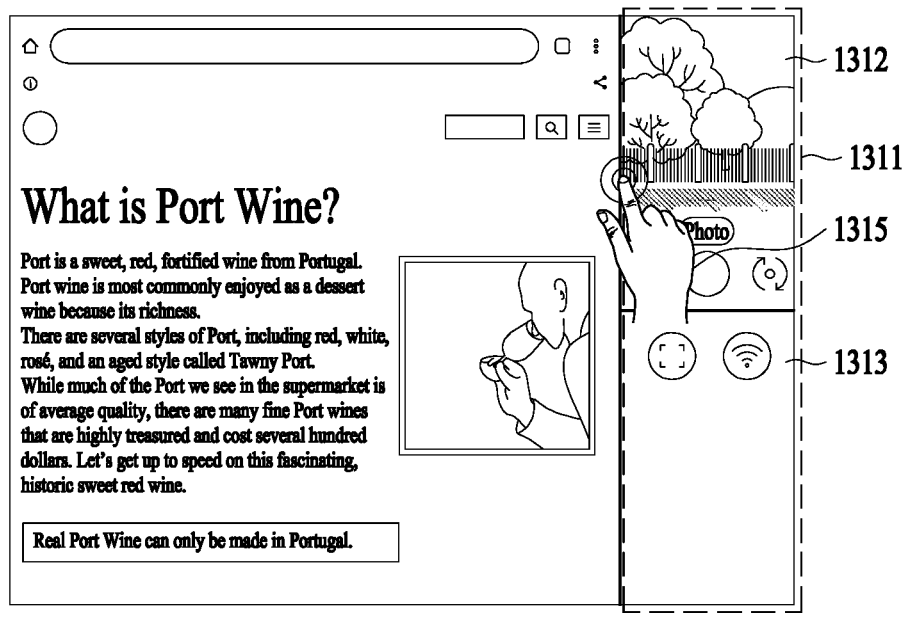
FIGS. 13 and 14 are diagrams illustrating an example of changing a notification UI displayed on a mobile terminal according to an example embodiment of the present disclosure.
Figure 13:
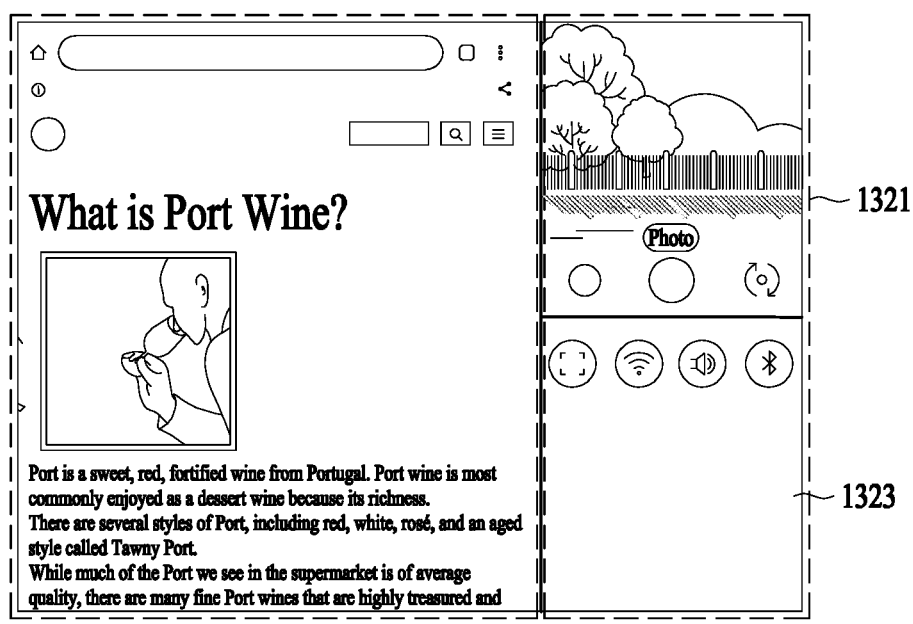
Figure 14:
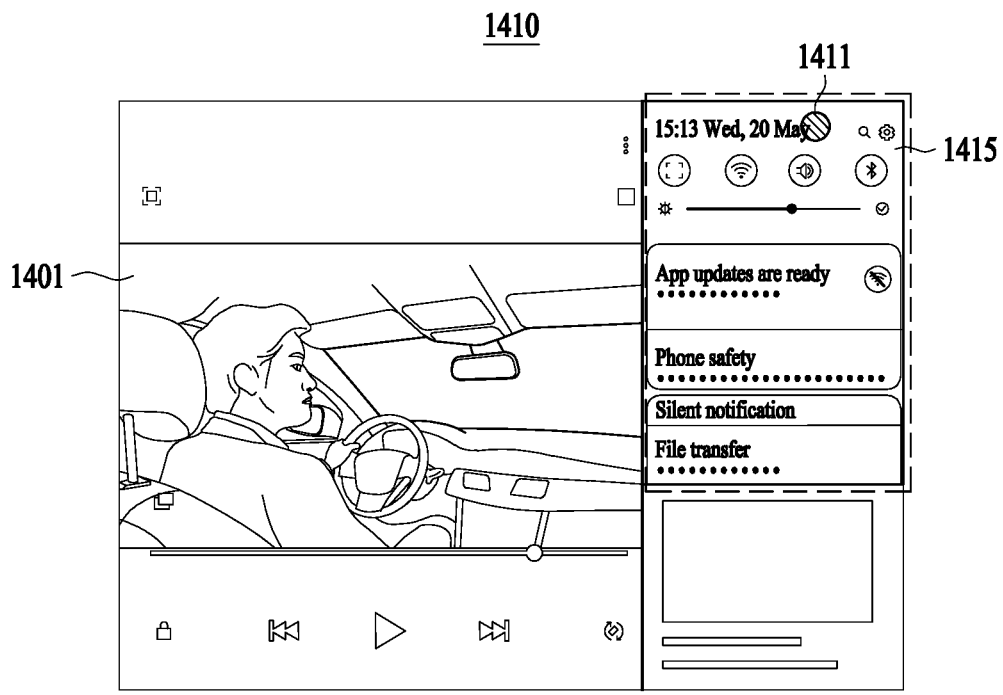
Figure 14:
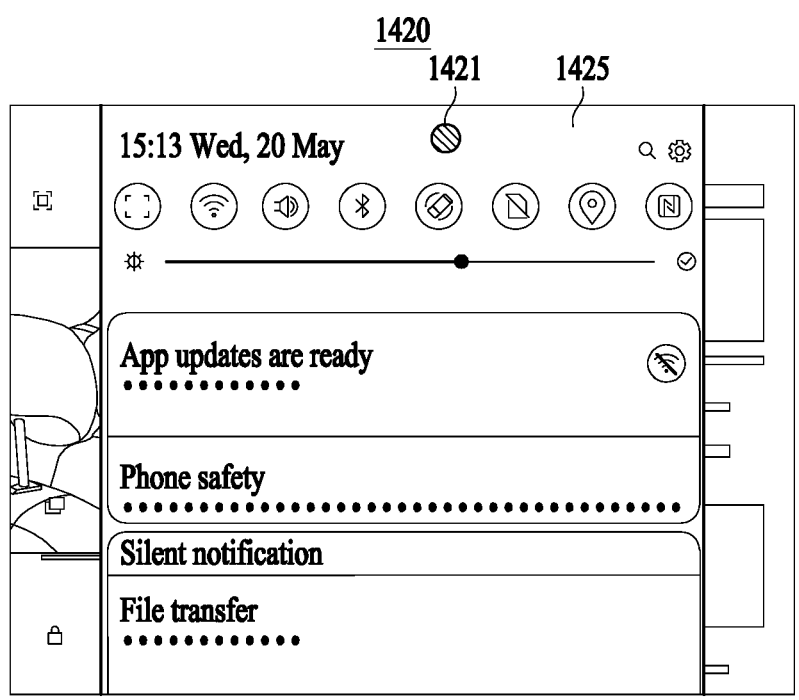

FIGS. 13 and 14 are diagrams illustrating an example of changing a notification UI displayed on a mobile terminal according to an example embodiment of the present disclosure.

FIG. 13 illustrates an example of changing a type of a notification UI in response to changes in sizes of the notification UI and second areas 1311 and 1321 in which second content is displayed.

Specifically, referring to reference numeral 1310, second content 1312 and a notification UI 1313 of a first type may be displayed in the second area 1311 in response to an execution of a camera application. The notification UI of the first type may be a notification UI having a first size and include two icons as illustrated.

In the example embodiment, a size of the second area 1311 may be changed in response to a user input 1315. In this case, as indicated by reference numeral 1320, the second area 1321 may be displayed with an increased size. In response to the second area 1311 increasing in size, the second content 1312 may be displayed with an increased size as illustrated.

In the example embodiment, the user input 1315 related to a size change of the second area 1311 may include a drag input that represents a movement of a boundary of the second area in response to the size change. For example, the user input 1315 may include a drag input for moving a portion of the boundary of the second area neighboring the first area to the left in response to the second area 1311 increasing in size in a left direction. However, it is merely an example, and the present disclosure is not limited to the example.

In response to the second area 1311 increasing in size, an area corresponding to the notification UI 1313 may be increased in size. In this case, the mobile terminal may identify a type of a notification UI corresponding to the increased size. In accordance with the type of the notification UI corresponding to the increased size being identified, the mobile terminal may display the type of the notification UI corresponding to the increased size, that is, a notification UI 1323 of a second type as indicated by the reference numeral 1320.

Referring to the reference numeral 1320, the notification UI 1323 may include greater types (or a greater number) of icons compared to the notification UI 1313 of the first type. However, the notification UI 1323 of the second type is not limited to the drawing illustrated. For example, the notification UI 1323 of the second type may include an icon of a shape different from that of the notification UI 1313 or icons arranged in different ways.

FIG. 14 illustrates an example of displaying a notification UI 1415 of which a type is changed in response to an input to a size change icon 1411 displayed in the notification UI 1415.

Specifically, referring to reference numeral 1410, the notification UI 1415 may be displayed in at least a portion of a second area. The notification UI 1415 may be a notification UI of a first type corresponding to a size of the second area. The notification UI 1415 may include the size change icon 1411 for changing a size (or changing a type) of the notification UI 1415.

When a user's input to the size change icon 1411 is detected, a mobile terminal may display a notification UI 1425 of a second type having a greater size as indicated by reference numeral 1420. The notification UI 1425 of the second type may be displayed irrespective of a setting related to a notification UI display of first content 1401 displayed in the first area. For example, at least a portion of the notification UI 1425 may be displayed to overlap at least a portion of the first content 1401 displayed in the first area.

In the example embodiment, the notification UI 1425 of the second type may include a size change icon 1421. Although not shown, when an input to the size change icon 1421 is received, the mobile terminal may change the notification UI 1421 of the second type to the notification UI 1415 of the first type so that a screen indicated by the reference numeral 1410 is provided again.

Figure 15:
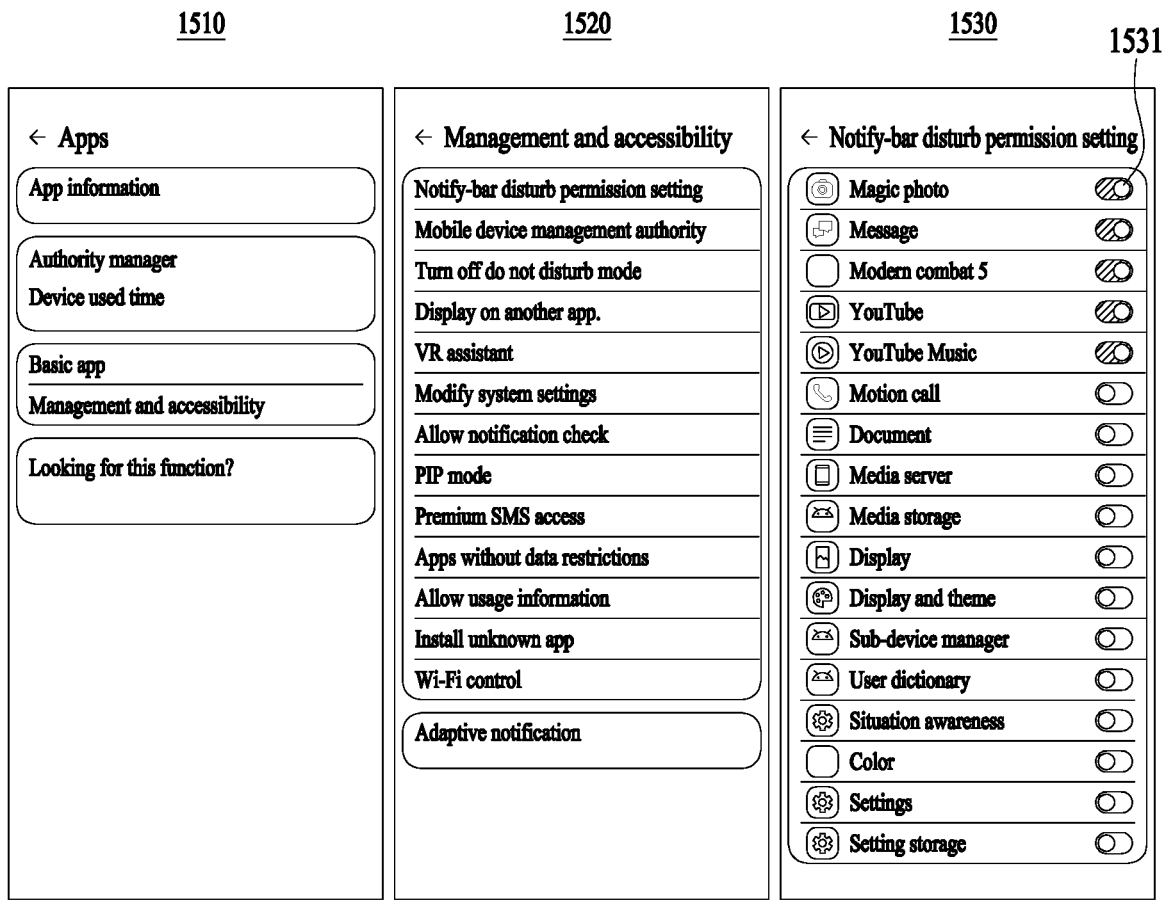
FIGS. 15 and 16 are diagrams illustrating notification UI display settings of a mobile terminal according to an example embodiment of the present disclosure.
Figure 16:
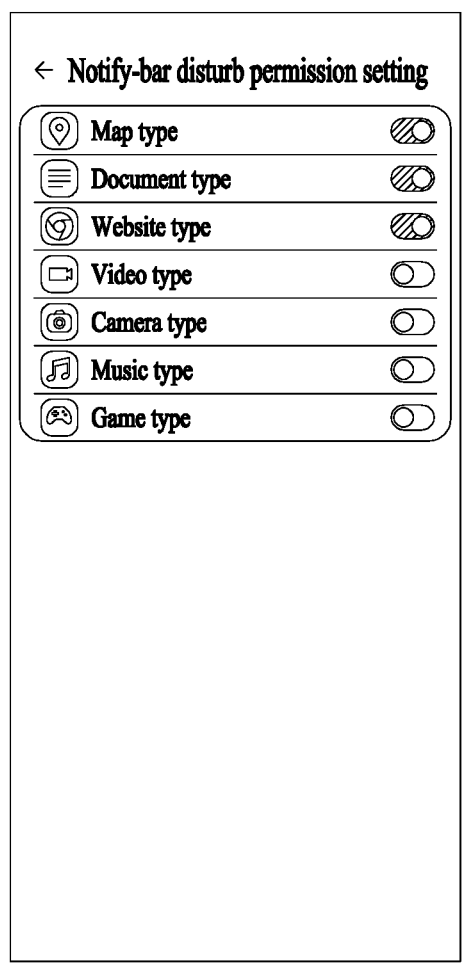

FIGS. 15 and 16 are diagrams illustrating notification UI display settings of a mobile terminal according to an example embodiment of the present disclosure.

FIG. 15 is a diagram illustrating an operation of the mobile terminal determining a setting related to a notification UI display for each application.

Specifically, reference numeral 1510 indicates a screen provided by an application that manages a setting related to a notification UI display. The application that manages the setting related to the notification UI display may include, for example, a setting application that controls various settings for managing the mobile terminal.

A screen indicated by reference numeral 1520 may be displayed in response to a "management and accessibility" item of the reference numeral 1510 being selected. The "management and accessibility" item may be selected based on an input of a user. For example, when a user's input is applied to an area in which a "management and accessibility" text is displayed, the "management and accessibility" item may be selected.

A screen indicated by reference numeral 1530 may be displayed in response to a "notify-bar disturb permission setting" item of the reference numeral 1520 being selected. Referring to the reference numeral 1530, a list showing each of a plurality of applications for the setting related to the notification UI display may be displayed. A switch icon (e.g., a first switch icon 1531) may be displayed for each of the plurality of applications.

In the example embodiment, when a circular-shaped portion of the switch icon is located on the left or displayed in a first pattern, a setting related to a notification UI display of an application corresponding to an area in which the switch icon is placed may be determined to be a first setting. When a circular-shaped portion of the switch icon is located on the right or displayed in a second pattern, a setting related to a notification UI display of an application corresponding to an area in which the switch icon is placed may be determined to be a second setting. However, it is merely an example, and a method of determining the first setting and the second setting may be implemented in other ways. For example, when a text of one of the first setting and the second setting is displayed, a setting corresponding to a selection input may be determined based on the selection input to a corresponding portion.

FIG. 16 illustrates a screen provided when a setting related to a notification UI display is determined for each application type. Specifically, when a setting related to a notification UI display is determined for each application type, the screen of FIG. 16 may be displayed instead of the screen indicated by the reference numeral 1530 of FIG. 15.

Referring to FIG. 16, in the example embodiment, an application type may include a map type, a document type, a website type, a video type, a camera type, a music type, and a game type. At least one application may be included for each type. For example, the map type may include a public transportation application and a navigation application. Also, the camera type may include various applications having camera functions.

A setting related to a notification UI display may be determined for each application type. Since a setting method related to a notification UI display has been described with reference to FIG. 15, repeated description will be omitted.

Figure 17:
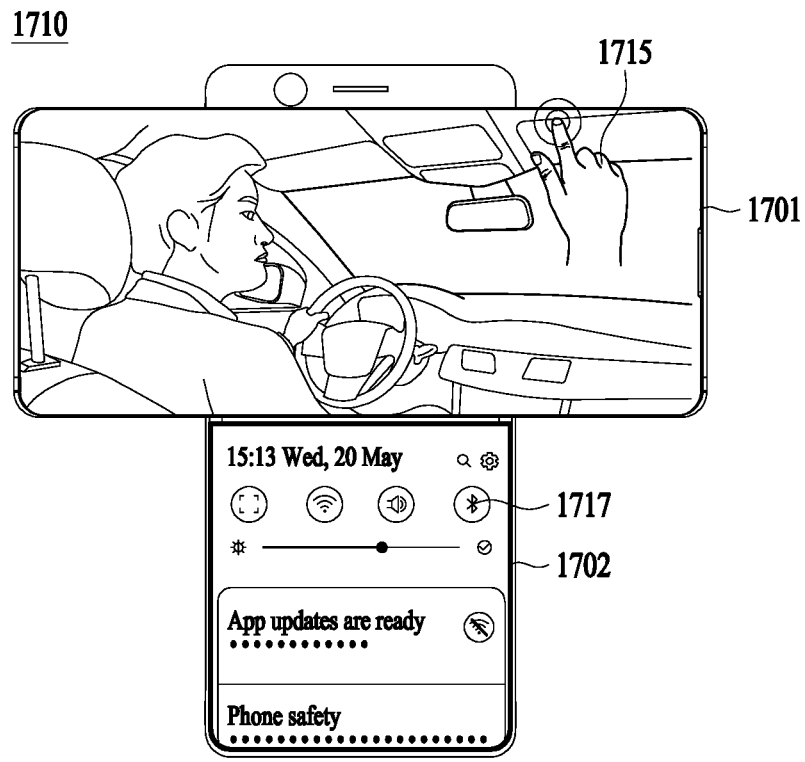
FIG. 17 is a diagram illustrating an example of implementing a mobile terminal according to an example embodiment of the present disclosure.
Figure 17:
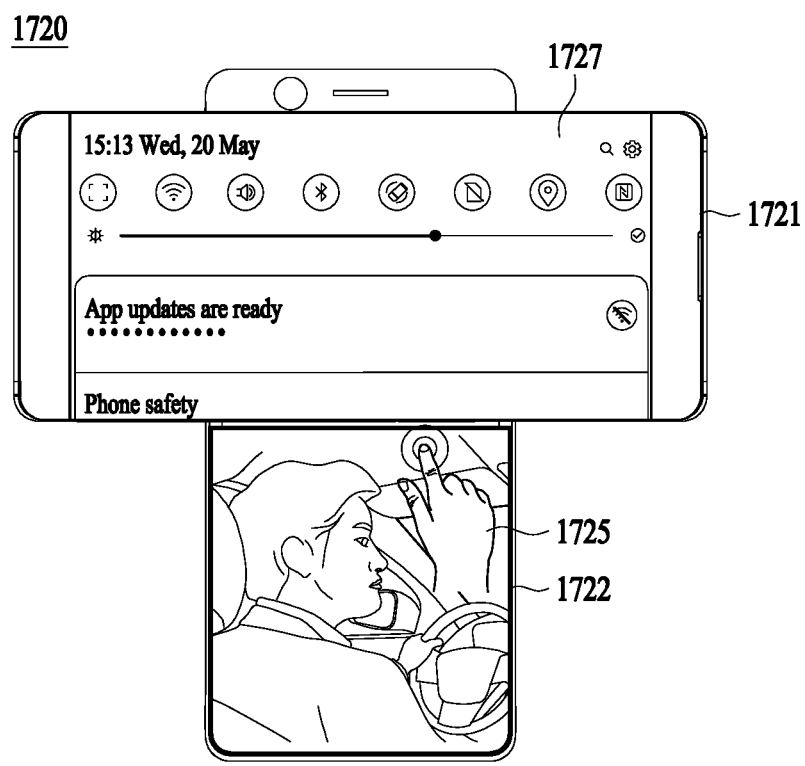

FIG. 17 is a diagram illustrating an example of implementing a mobile terminal according to an example embodiment of the present disclosure. Specifically, FIG. 17 illustrates an example of applying an example embodiment of the present disclosure when a mobile terminal is implemented in different ways.

Referring to FIG. 17, the mobile terminal may include a display having a plurality of areas arranged vertically. Specifically, first areas 1701 and 1721 of the display may be positioned horizontally. Second areas 1702 and 1722 may be positioned upright. The first area may be orthogonal to the second area.

In the example embodiment, as indicated by reference numeral 1710, a first input 1715 may be received in at least a portion of the first area 1701. The first input 1715 may include an input related to a notification UI display. For example, the first input 1715 may include a drag input of a first direction with respect to a top-bar portion of the first area 1701.

In this case, the mobile terminal may identify a setting related to a notification UI display of content displayed in the first area 1701 in response to the first input 1715 being received. When the setting related to the notification UI display of the content displayed in the first area 1701 corresponds to the first setting, the mobile terminal may display a notification UI (1717) in the second area 1702 as indicated by the reference numeral 1710.

In the example embodiment, as indicated by reference numeral 1720, a first input 1725 may be received in at least a portion of the second area 1722. The first input 1725 may include an input related to a notification UI display. For example, the first input 1725 may include a drag input of a first direction with respect to a top-bar portion of the second area 1722.

In this case, the mobile terminal may identify a setting related to a notification UI display of content displayed in the second area 1722 in response to the first input 1725 being received. When the setting related to the notification UI display of the content displayed in the second area 1722 corresponds to the first setting, the mobile terminal may display a notification UI 1727 in the first area 1721 as indicated by the reference numeral 1720.

According to an example embodiment of the present disclosure, when a plurality of contents is displayed based on a multitasking function, a mobile terminal and a control method thereof may display a notification UI on one content on which the notification UI is allowed to be displayed, among the plurality of contents. In this case, a user may continuously use content of which a notification UI is not displayed, so that the mobile terminal may maximize a content use efficiency.

Further, according to an example embodiment of the present disclosure, a mobile terminal and a control method thereof may display a notification UI based on a type of content displayed through a display, thereby minimizing restrictions on using content due to the display of the notification UI. For example, considering a type of content, the mobile terminal and the control method may display the notification UI on content with less inconvenience of content use while the notification UI is displayed, thereby increasing a content use efficiency.

According to example embodiments, it is possible to provide a mobile terminal and a control method thereof, the mobile terminal which displays a notification UI in at least a portion of a first area and a second area of a display based on a setting related to a notification UI display, thereby providing the notification UI with increased ease while maintaining a smooth use of an application being executed.

According to example embodiments, it is possible to provide a mobile terminal and a control method thereof, the mobile terminal which maximizes a content use efficiency by displaying, when a plurality of contents is displayed based on a multitasking function, a notification UI on one content among the plurality of contents based on a setting related to a notification UI display while other contents are available.

Effects are not limited to the aforementioned effects, and other effects not mentioned will be clearly understood by those skilled in the art from the description of the claims.

The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. A mobile terminal comprising:
a display; and
a processor, wherein the processor is configured to:
receive a first input related to displaying a notification user interface (UI) on a first area of the display, wherein first content corresponding to a first application is displayed in the first area;
identify the first content corresponding to the first application displayed in the first area based on the reception of the first input to determine displaying the notification UI in a second area or at least a portion of the first area of the display based on a setting related to a notification UI display of the identified first content, wherein the second area is different from the first area;
cause the display to display the notification UI in the second area of the display based at least in part on the received first input and when the setting related to displaying a notification UI of the first content corresponds to a first setting of the setting that prevents the notification UI from being displayed by overlapping the first content in the first area; and
cause the display to display the notification UI in at least a portion of the first area based at least in part on receiving the first input and when the setting related to displaying a notification UI of the first content corresponds to a second setting of the setting.

2. The mobile terminal of claim 1, wherein a speed for displaying the notification UI in the second area changes based at least in part on a moving speed of the first input.

3. The mobile terminal of claim 1, wherein the notification UI comprises at least an icon for controlling an operation of the mobile terminal or notification information.

4. The mobile terminal of claim 1, wherein the notification UI is displayed in the second area of the display according to a notification UI type identified based at least in part on a size of the second area.

5. The mobile terminal of claim 4, wherein the notification UI type comprises at least a first type and a second type,
wherein the notification UI is displayed in the second area according to the first type based at least in part on a size of the second area being greater than a predetermined size,
wherein the notification UI is displayed in the second area according to the second type based at least in part on the size of the second area being less than the predetermined size, and
wherein the notification UI displayed in the second area according to the first type displays a greater number of icons than the notification UI displayed in the second area according to the second type.

6. The mobile terminal of claim 4, wherein the processor is further configured to change a display scheme of the notification UI in response to a size change of the second area.

7. The mobile terminal of claim 1, wherein the setting related to displaying the notification UI is preset for each type of content,
wherein a type of the content comprises at least one of visual content, auditory content, or general content other than the visual content and the auditory content, and
the processor is further configured to cause the display to display the notification UI based on a type of the first content.

8. The mobile terminal of claim 1, wherein the processor is further configured to cause the display to display predetermined guide information in at least a portion of the first area or the second area when a setting related to displaying the notification UI of second content displayed in the second area corresponds to the first setting, wherein the second content corresponds to a second application.

9. The mobile terminal of claim 8, wherein the predetermined guide information comprises at least one of a specific text, a specific sound, a vibration of a specific pattern, or a specific image.

10. The mobile terminal of claim 1, wherein the processor is further configured to:
cause the display to display the notification UI over at least a portion of the first content when a setting related to displaying a notification UI of second content displayed in the second area corresponds to the first setting; and
cause the display to display the notification UI in the second area when the setting related to displaying the notification UI of second content displayed in the second area corresponds to a second setting that displays the notification UI by overlapping.

11. The mobile terminal of claim 1, wherein causing the display to display the notification UI in the second area comprises:
when a setting related to displaying the notification UI of second content displayed in the second area corresponds to the first setting, causing the display to display at least one of the first content or the second content in the second area with a reduced size and cause the display to display the notification UI in a third area defined according to at least one of the first content or the second content being displayed with the reduced size, and
causing the display to display the notification UI in the second area of the display when the setting related to displaying the notification UI of the second content displayed in the second area corresponds to a second setting that displays the notification UI in the first area.

12. The mobile terminal of claim 1, wherein when second content and third content are displayed in the second area, the processor is further configured to cause the display to display the notification UI on a portion of content corresponding to the second content or the third content when a setting related to displaying a notification UI corresponds to the second content and a setting related to displaying a notification UI corresponds to the third content.

13. The mobile terminal of claim 1, wherein when second content and third content are displayed in the second area, the processor is further configured to cause the display to display the notification UI to overlap at least a portion of content that is one of the second content or the third content according to priority information determined based at least in part on positions in which the second content and the third content are displayed or types of the second content and the third content.

14. A method of a mobile terminal, the method comprising:
receiving a first input related to displaying a notification user interface (UI) on a first area of a display, wherein first content corresponding to a first application is displayed in the first area;
identifying the first content corresponding to the first application displayed in the first area based on the reception of the first input to determine displaying the notification UI in a second area or at least a portion of the first area of the display based on a setting related to a notification UI display of the identified first content, wherein the second area is different from the first area;
displaying the notification UI in the second area of a display based at least in part on the received first input and when the setting related to displaying a notification UI of the first content corresponds to a first setting of the setting that prevents the notification UI from being displayed by overlapping the first content in the first area; and displaying to display the notification UI in at least a portion of the first area based at least in part on receiving the first input and when the setting related to displaying a notification UI of the first content corresponds to a second setting of the setting.

15. The method of claim 14, wherein the notification UI is displayed in the second area of the display according to a notification UI type identified based at least in part on a size of the second area.

16. The method of claim 15, further comprising changing a display scheme of the notification UI in response to a size change of the second area.

17. The method of claim 14, wherein the setting related to displaying the notification UI is preset for each type of content, wherein a type of the content comprises at least one of visual content, auditory content, or general content other than the visual content and the auditory content, and wherein displaying of the notification UI based on a type of the first content.

18. The method of claim 14, wherein the displaying of the notification UI in the second area comprises:

when the setting related to displaying the notification UI of second content displayed in the second area corresponds to the first setting, displaying at least one of the first content or the second content displayed in the second area with a reduced size and displaying the notification UI in a third area defined in accordance with at least one of the first content or the second content being displayed with the reduced size; and displaying the notification UI in the second area of the display when the setting related to displaying the notification UI of the second content displayed in the second area corresponds to a second setting that displays the notification UI in the first area, wherein the second content corresponds to a second application.

* * * * *